United States Patent
Shim et al.

(10) Patent No.: US 10,423,270 B2
(45) Date of Patent: Sep. 24, 2019

(54) MOBILE TERMINAL

(71) Applicant: LG ELECTRONICS INC., Seoul (KR)

(72) Inventors: Hongjo Shim, Seoul (KR); Hyunok Lee, Seoul (KR); Sungho Woo, Seoul (KR)

(73) Assignee: LG ELECTRONIC INC., Seoul (KR)

( * ) Notice: Subject to any disclaimer, the term of this patent is extended or adjusted under 35 U.S.C. 154(b) by 70 days.

(21) Appl. No.: 15/431,679

(22) Filed: Feb. 13, 2017

(65) Prior Publication Data

US 2017/0357362 A1 Dec. 14, 2017

(30) Foreign Application Priority Data

Jun. 13, 2016 (KR) ........................ 10-2016-0073372

(51) Int. Cl.
*G06F 3/041* (2006.01)
*G06F 3/0488* (2013.01)
*G06F 1/16* (2006.01)

(52) U.S. Cl.
CPC ............ *G06F 3/0416* (2013.01); *G06F 1/169* (2013.01); *G06F 1/1626* (2013.01); *G06F 3/0412* (2013.01); *G06F 3/0488* (2013.01); *G06F 2203/04101* (2013.01); *G06F 2203/04105* (2013.01)

(58) Field of Classification Search
CPC ...... G06F 3/0416; G06F 1/169; G06F 3/0488; G06F 1/1626; G06F 3/0412; G06F 2203/04105; G06F 2203/04101
See application file for complete search history.

(56) References Cited

U.S. PATENT DOCUMENTS

| | | | |
|---|---|---|---|
| 9,195,343 B1* | 11/2015 | Zarraga | G01L 1/2287 |
| 2011/0037624 A1 | 2/2011 | Pance et al. | |
| 2011/0038114 A1 | 2/2011 | Pance et al. | |
| 2014/0160010 A1* | 6/2014 | Jung | G06F 3/0414 |
| | | | 345/156 |
| 2016/0065827 A1* | 3/2016 | Dye | H04N 5/23206 |
| | | | 348/211.2 |

FOREIGN PATENT DOCUMENTS

EP 2175344 4/2010

OTHER PUBLICATIONS

European Patent Office Application Serial No. 17175203.3, Search Report dated Oct. 30, 2017, 8 pages.
European Patent Office Application Serial No. 17175203.3, Communication Pursuant to Article 94(3), dated May 6, 2019, 7 pages.

* cited by examiner

*Primary Examiner* — Andrew Sasinowski
(74) *Attorney, Agent, or Firm* — Lee, Hong, Degerman, Kang & Waimey

(57) ABSTRACT

A mobile terminal includes: a terminal body having a case formed of a metallic material at least partially; a metal key unit formed on one region of the case, and configured to sense a pressure of a touch input; and a controller configured to execute a specific function based on a pressure applied to the metal key unit, wherein the metal key unit includes: a flexible printed circuit board attached to a lower part of the case; and a pressure sensor configured to sense a pressure applied to the case.

20 Claims, 27 Drawing Sheets

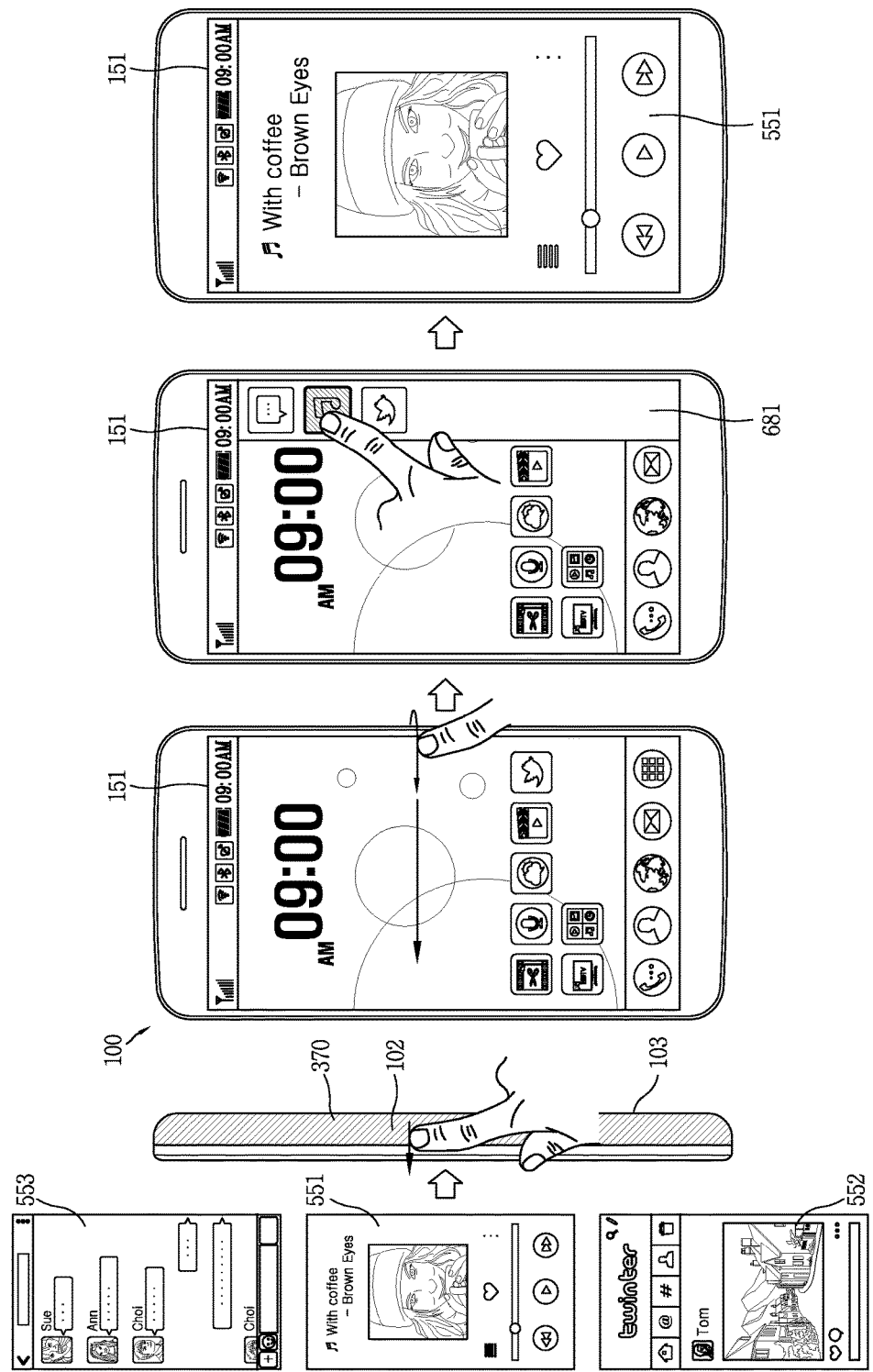

MOBILE TERMINAL

CROSS-REFERENCE TO RELATED APPLICATION

Pursuant to 35 U.S.C. § 119(a), this application claims the benefit of earlier filing date and right of priority to Korean Patent Application No. 10-2016-0073372 filed on Jun. 13, 2016, the contents of which are hereby incorporated by reference herein in its entirety.

BACKGROUND OF THE INVENTION

1. Field of the Invention

This specification relates to a mobile terminal having a metal key formed at a metal case.

2. Background of the Invention

A mobile terminal includes all types of devices provided with a battery and a display unit and carried by a user, the devices configured to output information to the display unit using power supplied from the battery. The mobile terminal includes a device for recording and playing moving images, a device for displaying a graphic user interface (GUI), etc., which includes a notebook, a mobile phone, glasses, a watch, a game console, etc.

Such mobile terminal has become increasingly more functional. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players.

Efforts are ongoing to support and increase the functionality of mobile terminals. Such efforts include software and hardware improvements, as well as changes and improvements in the structural components.

As a user's need for a design of the mobile terminal having a simple appearance increases recently, protruded keys are not required. As a result, keys are formed to have a decreased size. However, some important keys are disposed on an external surface of the mobile terminal in a protruded or concaved manner. This may lower an aesthetic sense of the mobile terminal.

SUMMARY OF THE INVENTION

Therefore, an aspect of the detailed description is to provide a mobile terminal having a case formed of a metallic material, and having metal keys formed not to be protruded to the outside to provide an integrated sense.

To achieve these and other advantages and in accordance with the purpose of this specification, as embodied and broadly described herein, there is provided a mobile terminal, including: a terminal body having a case formed of a metallic material at least partially; a metal key unit formed on one region of the case, and configured to sense a pressure of a touch input; and a controller configured to execute a specific function based on a pressure applied to the metal key unit, wherein the metal key unit includes: a flexible printed circuit board attached to a lower part of the case; and a pressure sensor configured to sense a pressure applied to the case.

In an embodiment, the mobile terminal may further include a display unit formed on one surface of the terminal body, and configured to receive a touch input and output screen information. The case may include: a rear case which forms a side surface of the terminal body; a front case which encloses an edge region of the display unit; and a rear cover which forms a rear surface of the terminal body, the rear surface facing the display unit. And the metal key unit may be composed of a plurality of metal keys, and may be formed on at least one of the rear case, the front case and the rear cover.

The controller may control the display unit to change the screen information, based on a pressure change of a touch input applied to the metal key unit. This may allow a user to execute various functions by applying a touch input to the display unit and the metal key unit.

In an embodiment, the controller may sense a pressure applied to the metal key unit, and may execute a different function based on a level of the pressure. This may allow a user to control various functions using the same metal key.

In an embodiment, the terminal body may include one or more electronic components. And when a touch input sensed by the metal key unit disposed at a region adjacent to one of the electronic components is moved to the display unit, the controller may control the display unit to output screen information related to the electronic component. This may allow a user to execute functions using the electronic components more conveniently.

In the present invention, since the metal key unit is integrally formed on one region of the case formed of a metallic material, an integrated sense with the case may be provided. This may allow the mobile terminal to have a simple appearance.

Further, since the metal key unit is formed at a bezel portion adjacent to the display unit, various functions may be executed through another touch input consecutive to a touch input firstly applied to the display unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 8A to 8E are conceptual views illustrating a control method using a sixth metal key unit disposed on side surfaces of a mobile terminal;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
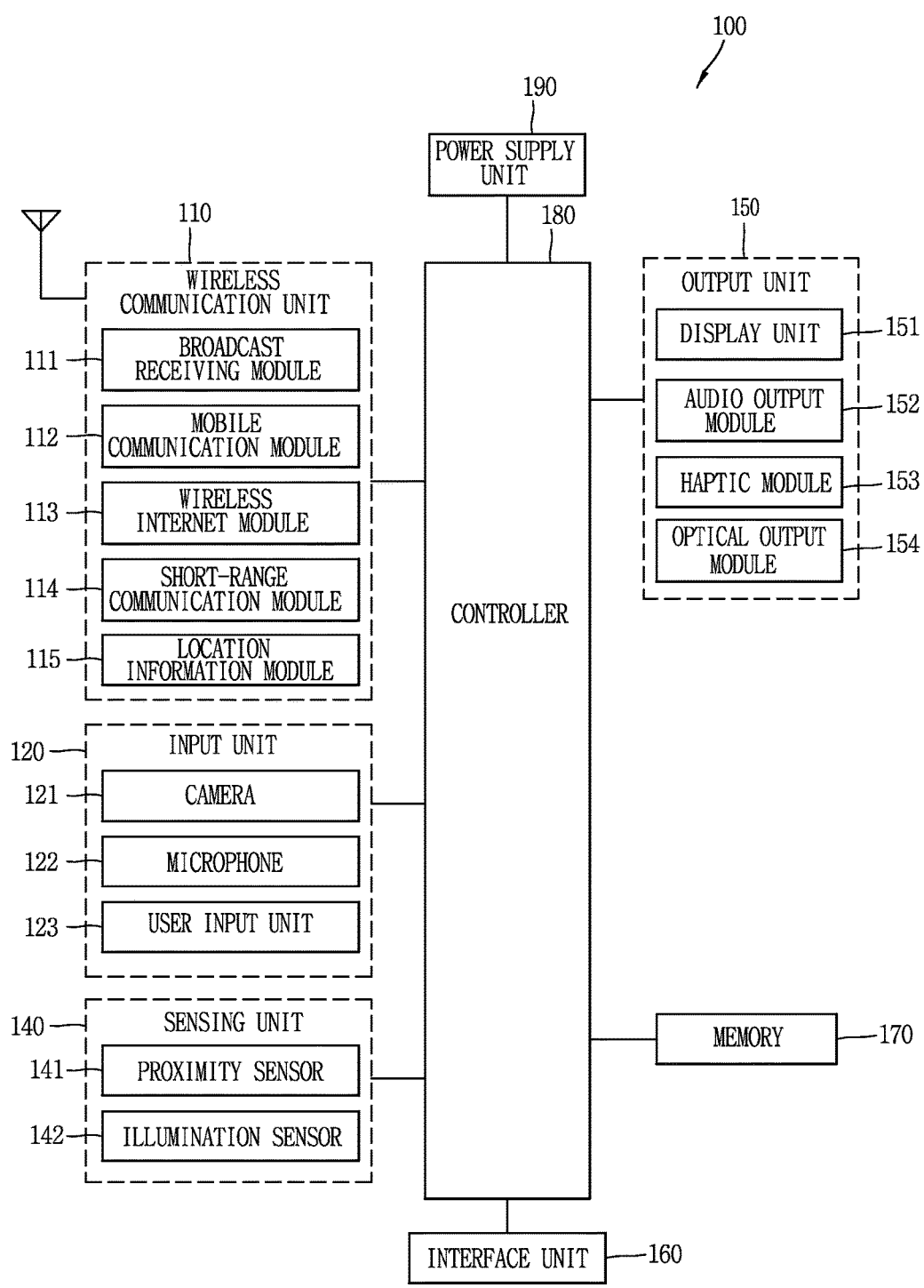
FIG. 1A is a block diagram of a mobile terminal according to the present invention.
Figure 1B:
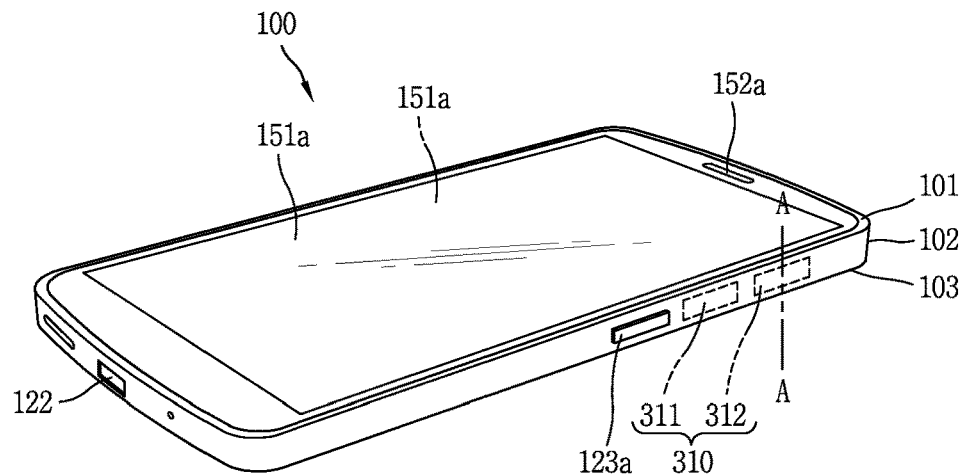
FIGS. 1B and 1C are conceptual views illustrating an example of a mobile terminal according to the present invention, which are viewed from different directions.
Figure 1C:
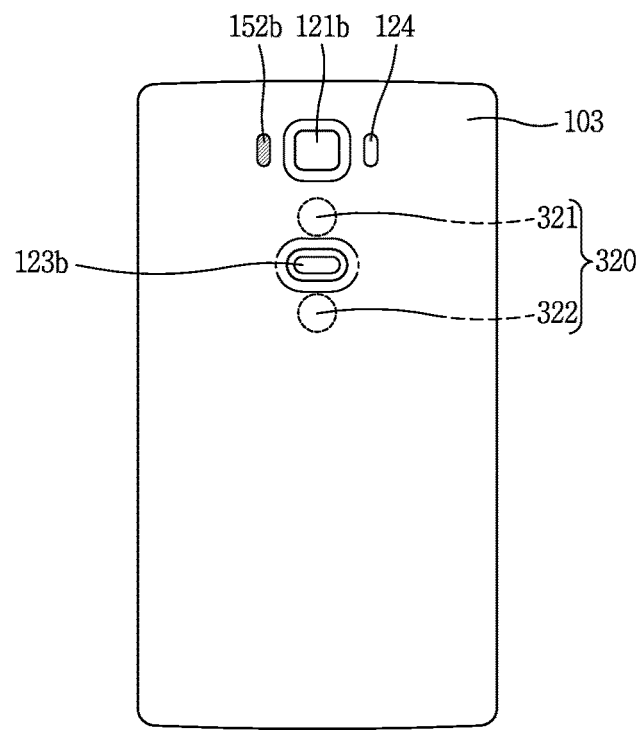

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the body, or configured to be detachable from the body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the body to output information. As illustrated, a window 151*a* of the display unit 151 may be mounted to the front case 101 to form the front surface of the body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the body, and the second audio output module 152b may be located on the side surface of the body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the body. As one example, the rear input unit may be located on an upper end portion of the rear side of the body such that a user can easily manipulate it using a forefinger when the user grabs the body with one hand. Alternatively, the rear input unit can be positioned at most any location of the rear side of the body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the body. The second audio output module 152*b* may implement stereophonic sound functions in conjunction with the first audio output module 152*a*, and may be also used for implementing a speaker phone mode for call communication.

At least one antenna for wireless communication may be located on the body. The antenna may be installed in the body or formed by the case. For example, an antenna which configures a part of the broadcast receiving module 111 may be retractable into the body. Alternatively, an antenna may be formed using a film attached to an inner surface of the rear cover 103, or a case that includes a conductive material.

A power supply unit 190 for supplying power to the mobile terminal 100 may include a battery 191, which is mounted in the body or detachably coupled to an outside of the body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the body, the rear cover 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

At least part of the case which forms the appearance of the mobile terminal 100 may be formed of a metallic material. And the mobile terminal 100 may include at least one metal key formed at the case formed of a metallic material. Referring to FIGS. 1B and 1C, the mobile terminal 100 may include a first metal key unit 310 formed at the rear case 102 which constitutes the side surfaces of the mobile terminal 100, and a second metal key unit 320 formed at the rear cover 103. The first metal key unit 310 includes first metal keys 311, 312, and the second metal key unit 320 includes second metal keys 321, 322. However, the number of the metal keys, and the arrangement structure of the metal keys are not limited to this.

The first and second metal key units 310, 320 may be protruded or concaved from an outer surface of the mobile terminal 100. And regions where the first and second metal key units 310, 320 are formed may be plated in different colors. However, the present invention is not limited to this.

Figure 2A:
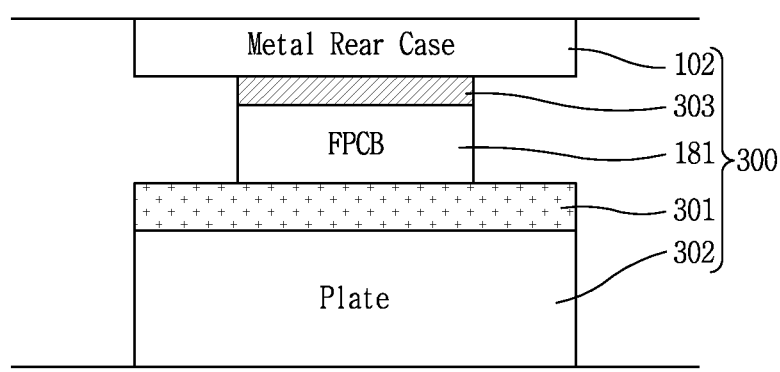
FIGS. 2A and 2B are conceptual views illustrating a structure of a metal key according to the present invention.
Figure 2B:
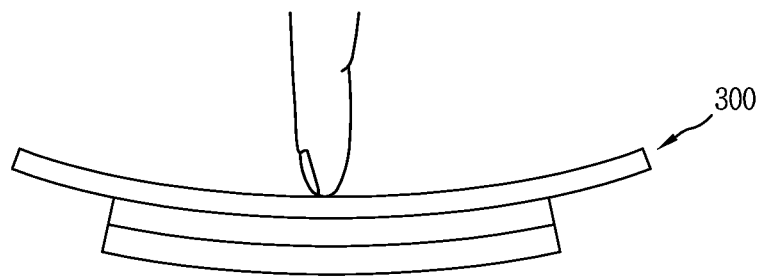

FIGS. 2A and 2B are conceptual views illustrating a structure of a metal key according to the present invention.

Referring to FIGS. 2A and 2B, a metal key unit 300 is formed at a metal region which forms the appearance of the mobile terminal.

For instance, when the rear case 102 is formed of a metallic material, the metal key unit 300 is part of the rear case 102. The rear case 102 contacts a printed circuit board 181 by a bonding member 303, and a pressure sensor 301 is formed at the printed circuit board 181. The pressure sensor 301 is fixed to a base substrate 302, and senses a pressure applied to the rear case 102.

The metal key unit 300 is driven by a strain gauge method. In a case where resistance lines of a lattice shape are disposed and a load is applied to the resistance lines, if a length of the resistance lines is changed, a pressure of a touch input is sensed by a changed resistance value. However, a method of sensing a touch input by the metal keys is not limited to this.

Figure 3A:
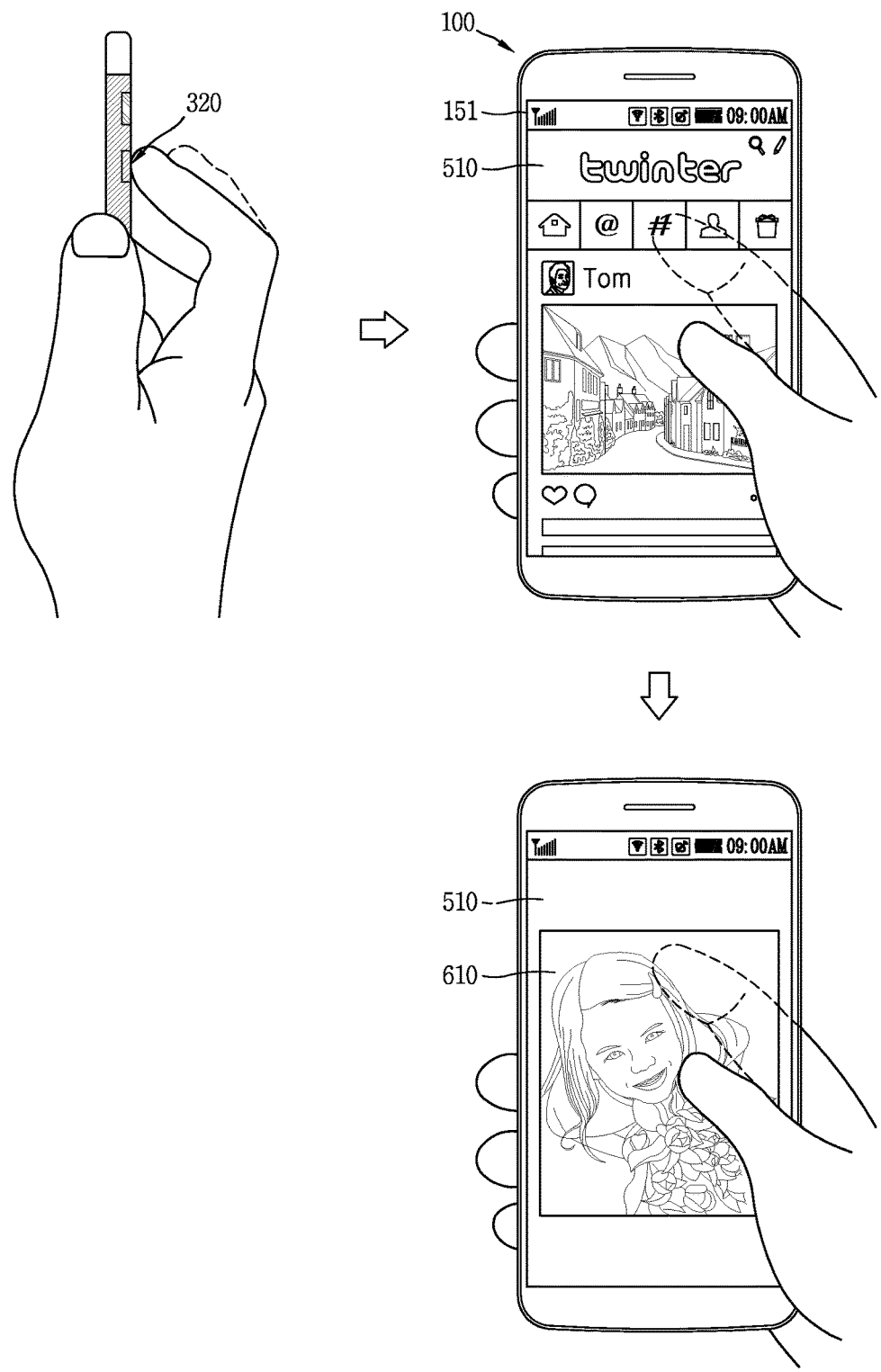
FIGS. 3A to 3C are conceptual views illustrating a control method by manipulation of a single metal key unit according to an embodiment of the present invention.
Figure 3B:
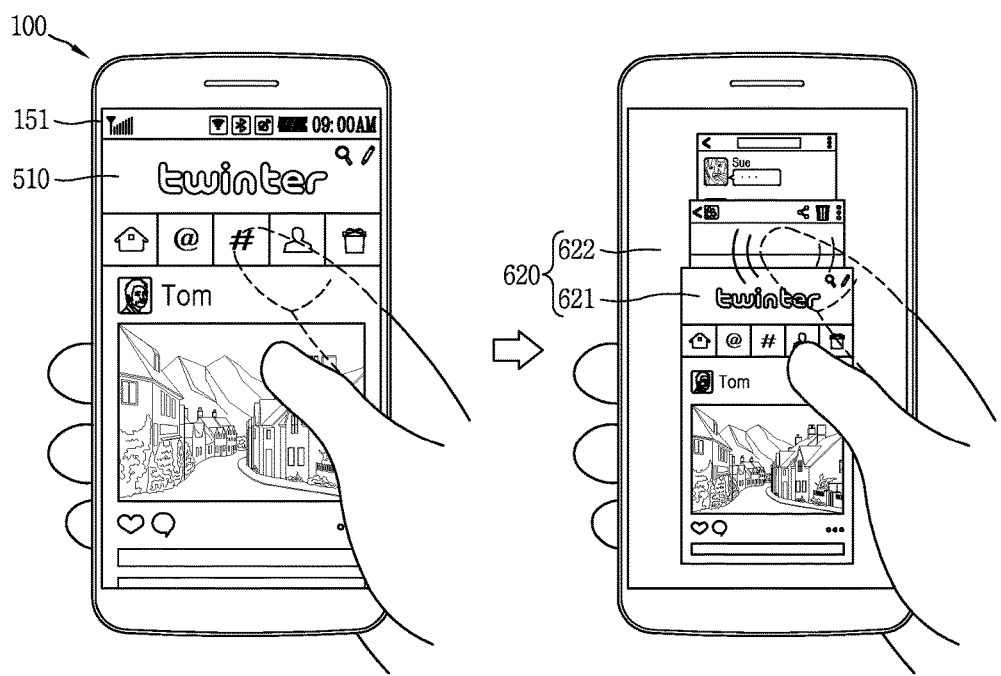
Figure 3C:
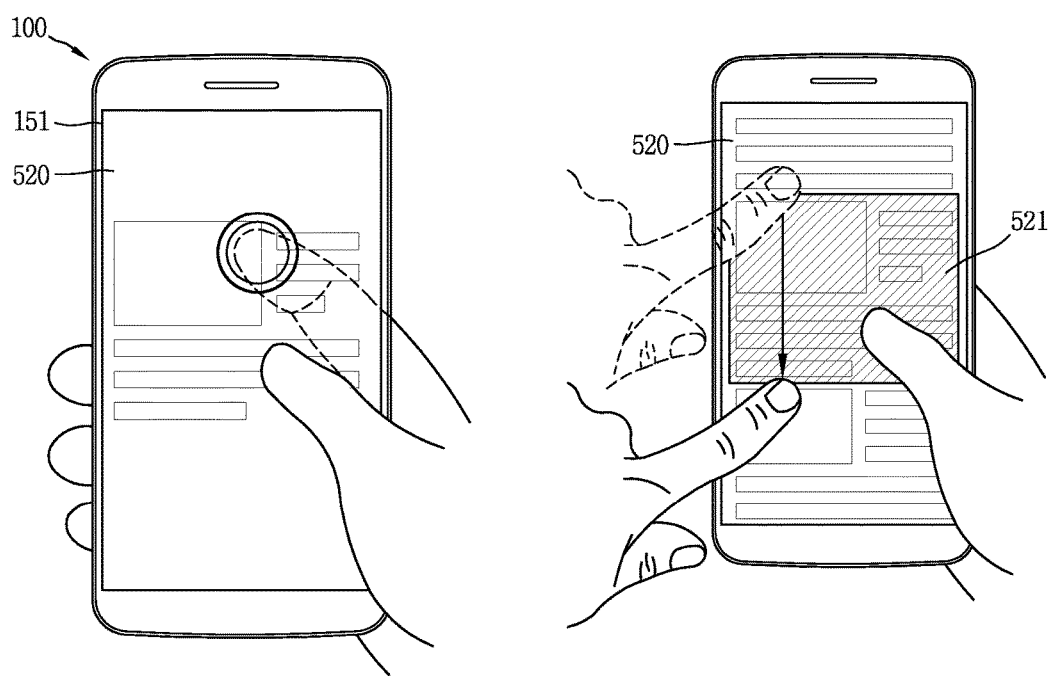

FIGS. 3A to 3C are conceptual views illustrating a control method through manipulation of a single metal key unit according to an embodiment of the present invention;

Referring to FIGS. 3A to 3C, a metal key unit manipulated to perform a specific function is implemented as the second metal key unit 320 formed at the rear cover 103 of the mobile terminal 100. However, the present invention is not limited to this. That is, the control method according to this embodiment may be executed by the first metal key unit 310 formed on the side surface of the mobile terminal 100.

Referring to FIGS. 1C and 3A, will be explained a method of controlling the mobile terminal by manipulating the second metal key unit 320. The second metal key unit 320 may be formed in a state where the second manipulation unit 123*b* is disposed therebetween. The second metal key unit 320 may be formed to be integral with the rear cover 103.

The controller 180 may control activation of the second metal key unit 320 based on a user's setting. That is, once the second metal key unit 320 is converted into an inactivated state according to a user's setting, a specific function is not executed even if a pressure is applied to the second metal key unit 320.

In a case where the mobile terminal is set to execute a specific function when a pressure is applied to the second metal key unit 320, the controller 180 may execute a specific function by sensing a pressure applied to at least one metal key included in the second metal key unit 320.

In a state where first screen information 510 has been output to the display unit 151, the controller 180 executes a specific function by sensing a pressure applied to the second metal key unit 320. And the controller 180 controls the display unit 151 to output a first function screen 610 according to the specific function. Referring to FIG. 3A, the controller 180 outputs an execution screen of an application which was being executed as the first function screen 610.

The first function screen 610 may be output in an overlapped manner with part of the first screen information 510. The controller 180 may continuously output the first function screen 610 while a pressure is being applied to the second metal key unit 320. That is, when the pressure being applied to the second metal key unit 320 is released, the controller 180 controls the first function screen 610 to disappear from the display unit 151.

While a pressure is being applied to the second metal key unit 320, the controller 180 may control a function of the application, based on a touch input applied to the display unit 151. Although not shown, the controller 180 controls the first function screen 610 and an application corresponding to the first function screen 610, based on a specific control command applied to the second metal key unit 320 or the display unit 151. And the controller 180 may activate an application corresponding to the first function screen 610, not an application corresponding to the first screen information 510, based on a specific control command.

In the present invention, an additional function may be executed as a pressure applied to a metal key formed on an outer surface of the mobile terminal is sensed. The metal key may be activated or deactivated according to a user's setting. Since the metal key is formed to provide an integrated sense to the appearance of the mobile terminal, it makes the mobile terminal have a simple appearance, and it may provide various controls by being activated when necessary.

Referring to FIG. 3B, in the output state of the first screen information 510, the controller 180 controls the display unit 151 to output a second function screen 620 including a list of one or more applications being executed, based on a control command applied to the second metal key unit 320. The second function screen 620 includes a first image 621 and a second image 622 indicating an application being currently executed in a deactivated state, or an application which has been executed. However, the images correspond to a plurality of applications, and the number of the images is not limited. The plurality of images may be sequentially output in an overlapped manner with each other as shown, but the present invention is not limited to this.

The controller 180 may sequentially output a larger number of images based on a level of a pressure applied to the second metal key unit 320. For instance, when a pressure is applied to the second metal key unit 320, a first single image is output. And when the pressure is gradually increased, a larger number of images are output such that a larger number of applications which were being executed are displayed gradually. The image may be an execution screen of the application.

Although not shown, the controller 180 may select one of a plurality of images based on a control command applied to the display unit 151 or other input unit, thereby activating a corresponding application.

In this embodiment, a user may be sequentially provided with applications which have been executed by controlling a level of the pressure.

Referring to FIG. 3C, the display unit 151 outputs second screen information 520 including a plurality of contents. For instance, the plurality of contents may be at least one of texts, images and videos each output sequentially. The display unit 151 outputs additional screen information of the second screen information 520 formed to be consecutive to each other, based on a touch input applied to the second screen information 520 (e.g., a dragging type of touch). That is, the display unit 151 may sequentially output contents formed to be consecutive to each other, based on the touch input.

The controller 180 executes a specific function based on a touch input applied to the display unit 151, based on a pressure applied to the second metal key unit 320. For instance, the controller 180 selects one region of the second screen information 520 based on a touch input applied to the display unit 151, while a pressure applied to the second metal key unit 320 is sensed. The display unit 151 may change an output state of one or more contents selected from the second screen information 520. When the pressure applied to the second metal key unit 320 is released, the controller 180 may execute a function related to the content selected based on the touch input. For instance, an icon to execute a function related to the content may be output to the display unit 151.

In this embodiment, a user may execute a different control through the same type of touch using the second metal key unit.

In the present invention, a different control method may be executed as a user applies an additional pressure by using the second metal key unit disposed on the rear surface of the mobile terminal, while the mobile terminal is being used.

Figure 4A:
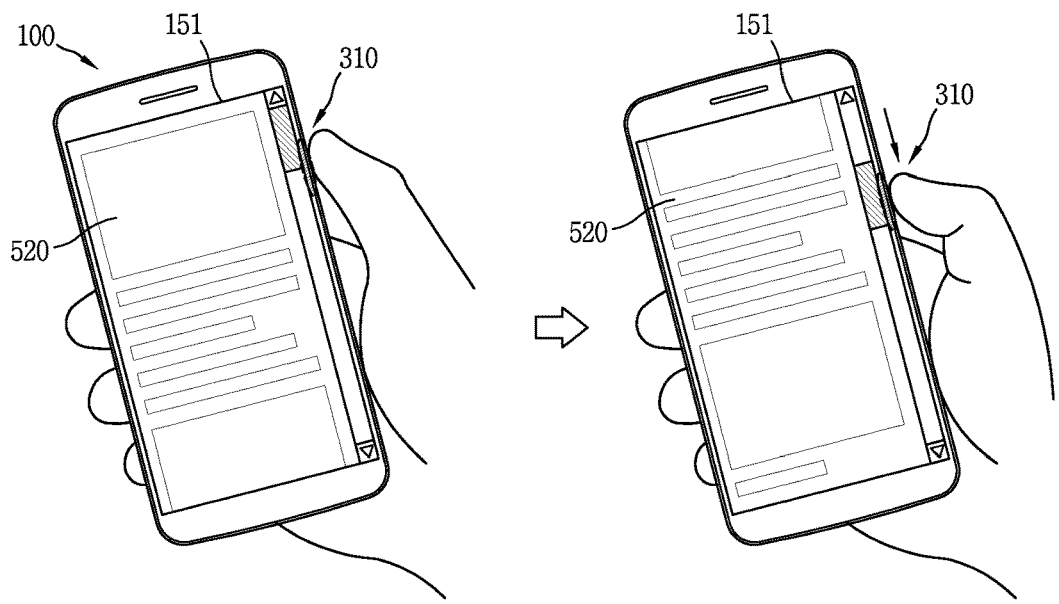
FIGS. 4A to 4C are conceptual views illustrating a method of controlling a mobile terminal using metal keys disposed on side surfaces of the mobile terminal.
Figure 4B:
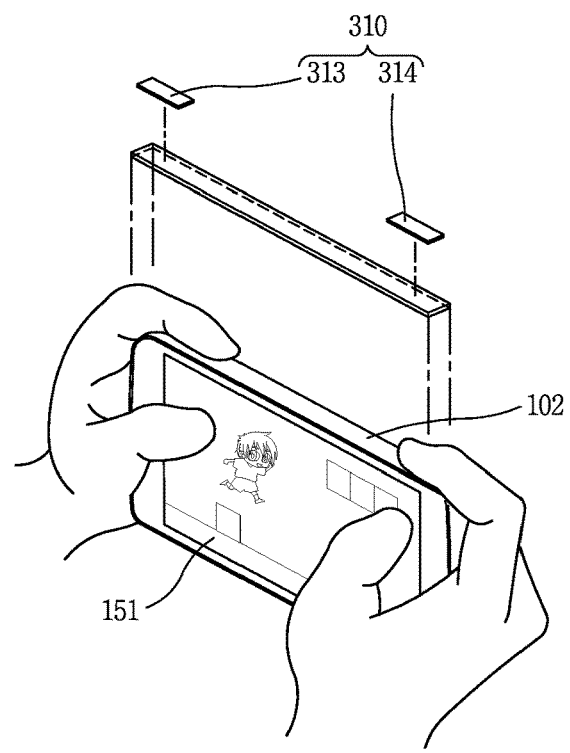
Figure 4C:
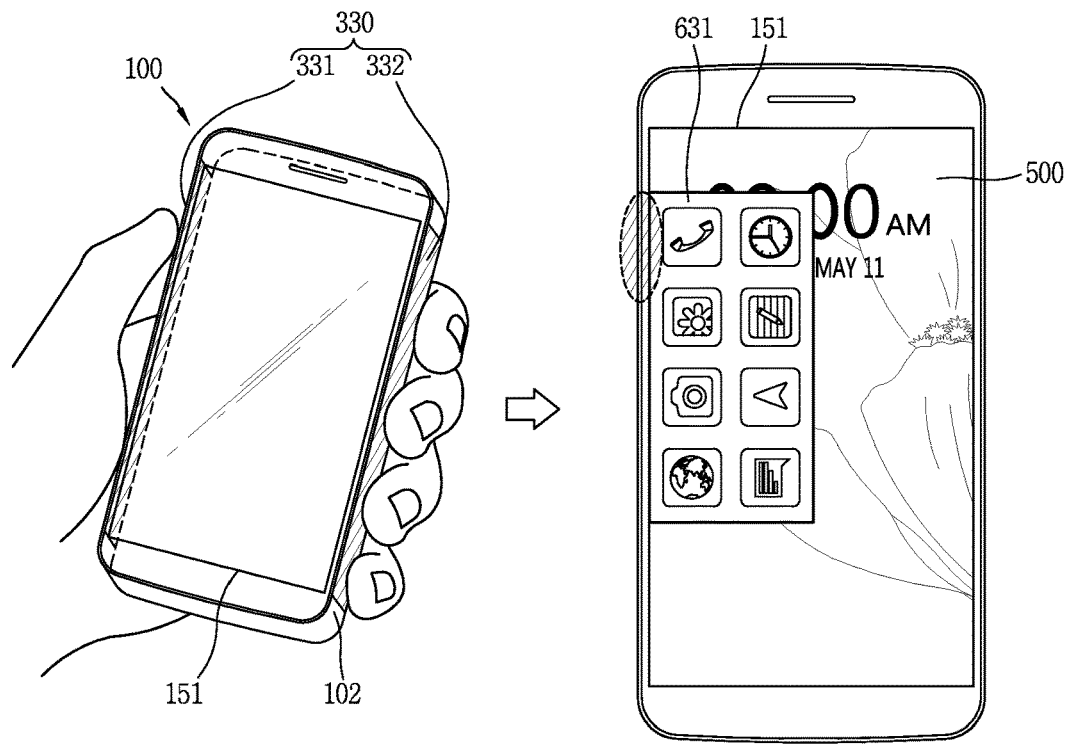
Figure 4C:

FIGS. 4A to 4C are conceptual views illustrating a method of controlling the mobile terminal using metal keys disposed on side surfaces of the mobile terminal.

Referring to FIG. 4A, the first metal key unit 310 is disposed on one side surface of the mobile terminal 100 in one direction. The first metal key unit 310 may be composed of a plurality of metal keys disposed inconsecutively. Alternatively, the first metal key unit 310 may be composed of a single metal key.

The controller 180 may change the second screen information 520 based on a pressure applied to the first metal key unit 310. For instance, when the second screen information 520 includes a plurality of contents disposed consecutively, the controller 180 sequentially outputs the plurality of contents of the second screen information 520, based on a pressure applied to the first metal key unit 310. Here, the pressure applied to the first metal key unit 310 may be sequentially applied to a plurality of metal keys disposed in one direction.

A change direction of the second screen information 520 is determined according to a pressure sensing order by one of the plurality of metal keys disposed in one direction. In this case, the controller 180 may change part of the plurality of contents, in the same manner as the control, based on a touch input applied to the display unit 151 (e.g., a dragging type of touch).

That is, a user may change the contents output to the display unit 151 by changing his or her hand which holds the mobile terminal, without applying an additional touch to the display unit 151. Thus, the user may control screen information output to the display unit 151, without blocking the screen information by the hand.

Referring to FIG. 4B, the first metal key unit 310 includes third and fourth metal keys 313, 314 spaced from each other. The third and fourth metal keys 313, 314 may be spaced from each other as far as possible, on the same side surface of the mobile terminal 100. That is, the third and fourth metal keys 313, 314 are disposed to be adjacent to two corners.

The controller 180 may provide different functions to the third and fourth metal keys 313, 314. Referring to FIG. 4B, once a game application is executed, the third and fourth metal keys 313, 314 correspond to different controls.

In this case, a user may control the game application by applying pressures to the third and fourth metal keys 313, 314 disposed on the side surface of the mobile terminal, using two hands. Accordingly, an icon for a game, etc. needs not be output to the display unit 151, and the game application may be controlled in a state where a display screen is not blocked by the user's hand. This may allow the user to utilize a wider region of the display screen.

Referring to FIG. 4C, the mobile terminal includes a third metal key unit 330 composed of first and second metal keys 331, 332 disposed on two side surfaces of the mobile terminal which face each other. Each of the first and second metal keys 331, 332 may include a plurality of metal keys disposed in an extended direction on the side surface.

The controller 180 may sense a position of a user's hand which holds the mobile terminal by the first and second metal keys 331, 332. The controller 180 controls the display unit 151 to output a third function screen 631 on one region of the display unit 151, the region adjacent to one of the first and second metal keys 331, 332 which has sensed a pressure of a single finger. For instance, if a pressure of a single finger is sensed by the first metal key 331, the third function screen 631 is output to a left region of the display unit 151 adjacent to the first metal key 331. In this case, the second metal key 332 senses a pressure of a plurality of fingers. For instance, a case where a pressure is sensed by a plurality of metal keys of the first and second metal keys 331, 332, and a case where a pressure is sensed by a single metal key may be distinguished from each other.

The third function screen 631 may include a plurality of icons for execution of applications, or may include a virtual keyboard for input of texts.

When the second metal key 332 senses a pressure of a single finger, the third function screen 631 is output to one region of the display unit 151 adjacent to the second metal key 332 (the right region in FIG. 4C). Accordingly, a user may apply a touch input to the third function screen 631 using the thumb.

For instance, in a case where the third function screen 631 is output as a specific application is executed, the third function screen 631 may be output to a different region according to a position of a user's finger, such that the user may easily apply a touch input using his or her finger.

If a pressure larger than a reference pressure and applied to support the mobile terminal 100 is sensed by the first metal key 331 or the second metal key 332, the controller 180 controls the display unit 151 to output the third function screen 631, to a region adjacent to the corresponding metal key which has sensed the pressure.

That is, when a pressure is applied by a user's intention, the third function screen 631 is output to a region where the pressure has been applied, such that a user may easily touch the third function screen 631 using his or her finger. This may allow the user to easily output the third function screen 631, by applying a pressure using one or more fingers which hold the mobile terminal 100.

Referring to FIG. 4C, the controller 180 may control the third metal key unit 330 to sense a pressure in a state where a specific image 500 has been output to the activated display unit 151. However, the present invention is not limited to this. For instance, if a pressure is sensed by the third metal key unit 330 in a deactivated state of the display unit 151, the controller 180 may activate the display unit 151 and may control the display unit 151 to output the third function screen 631.

In this embodiment, since the function screen is output to one region of the display unit 151 where a user may easily apply a touch input, the user may apply a touch input using one or more fingers which hold the mobile terminal, even when the display unit 151 has a large size.

Figure 5A:
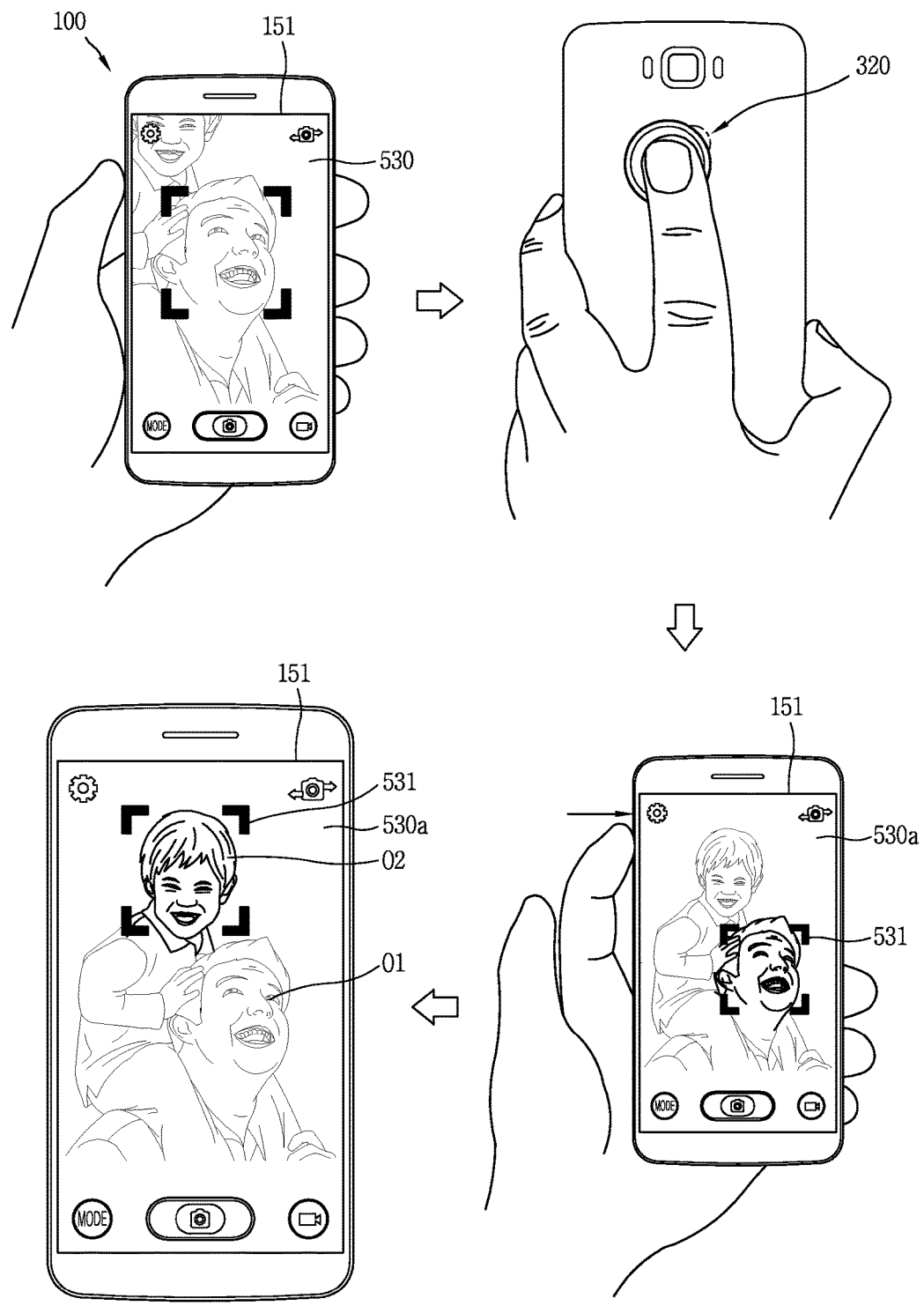
FIGS. 5A and 5B are conceptual views illustrating a control method utilizing first and second metal key units disposed on different regions.
Figure 5B:
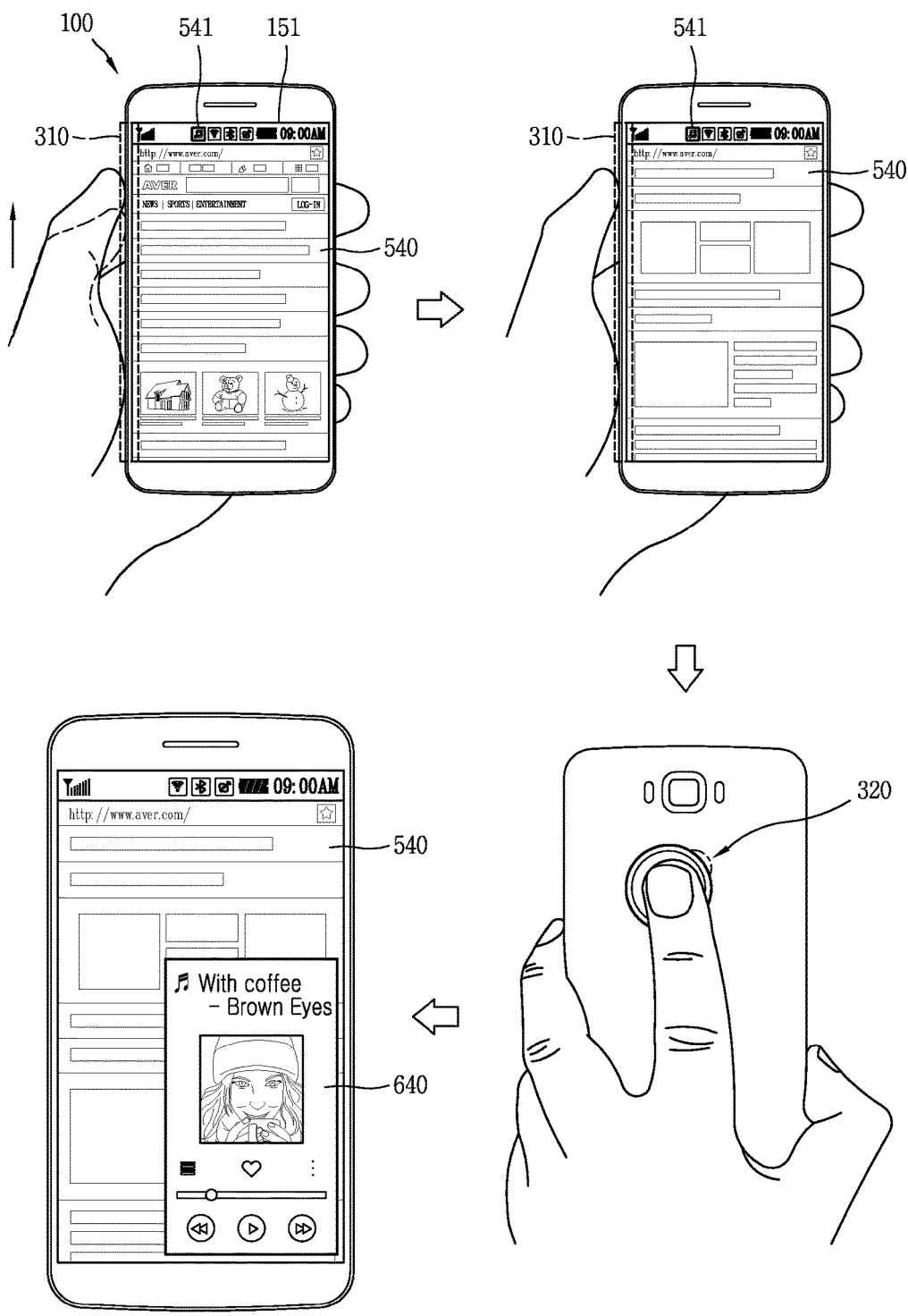

FIGS. 5A and 5B are conceptual views illustrating a control method utilizing first and second metal key units disposed on different regions.

Referring to FIG. 5A, will be explained a control method of executing first and second functions using the first and second metal key units, while the same application is being executed. The display unit 151 outputs a preview image 530 obtained by the camera 121, while the camera 121 is in an activated state.

Once a pressure applied to the second metal key unit 320 is sensed, the controller 180 controls a zoom-in degree or a zoom-out degree of the camera 121. The controller 180 may control the zoom-in degree or the zoom-out degree of the camera 121, based on a level of the pressure applied to the second metal key unit 320. When the pressure is released, the zoom-in degree or the zoom-out degree may be maintained. Referring to FIG. 5A, the preview image 530 is changed into a zoom-in image 530a.

The display unit 151 outputs a focus image 531 to a focusing region. When a pressure applied to the first metal key unit 310 is sensed, the controller 180 controls the camera 121 to focus on different regions, and changes an output region of the focus image 531. For instance, the controller 180 extracts a figure from the preview image 530. In this case, a first figure 01 and a second figure 02 may be extracted, and the first figure 01 may be focused.

When a pressure applied to the first metal key unit 310 is sensed, the controller 180 controls the camera 121 to focus on the second figure 02.

That is, different functions may correspond to the first and second metal key units in a single application, and a user may control various functions of the application using his or her hand which holds the mobile terminal.

Referring to FIG. 5B, the display unit outputs fourth screen information 540 composed of a plurality of contents disposed sequentially, and a function icon 541 indicating a current activated application. For instance, the function icon 541 may be displayed on an indicator bar indicating a driving state of the mobile terminal 100. For instance, when music is being played by an executed music application, the function icon 541 indicating that the music is being played is displayed on the indicator bar. The display unit 151 may display additional information of an application corresponding to the function icon 541, based on a touch input applied to the indicator bar.

Once a pressure applied to the first metal key unit 310 is sensed, the controller 180 controls the display unit to sequentially output contents. When a pressure change or a finger movement is sensed by the first metal key unit 310, the controller 180 controls the display unit 151 to change the fourth screen information 540.

The control method of changing screen information using the first metal key unit 310 is similar to that of FIG. 4A, and thus detailed explanations thereof will be replaced by those of FIG. 4A.

The controller 180 controls the display unit 151 to output a function image 640 of an application related to the function icon 541, based on a pressure applied to the second metal key unit 320. The function image 640 may include execution information of an application being executed, and may include a graphic image which receives a touch input for control of an application.

The controller 180 may output the function image 640 only while a pressure is applied to the second metal key unit 320. Alternatively, when a pressure is applied to the second metal key unit 320, the controller 180 may selectively control output or disappearance of the function image 640.

The function image 640 may be output to the fourth screen information 540 in the form of a pop-up window, but the present invention is not limited to this. For instance, the fourth screen information 540 may be output to one region of the display unit 151, and the function image 640 may be output to another region of the display unit 151.

In this embodiment, the first metal key unit may be used to control an application being currently executed, and the second metal key unit may be used to control other applications being executed together with the current application.

Figure 6A:
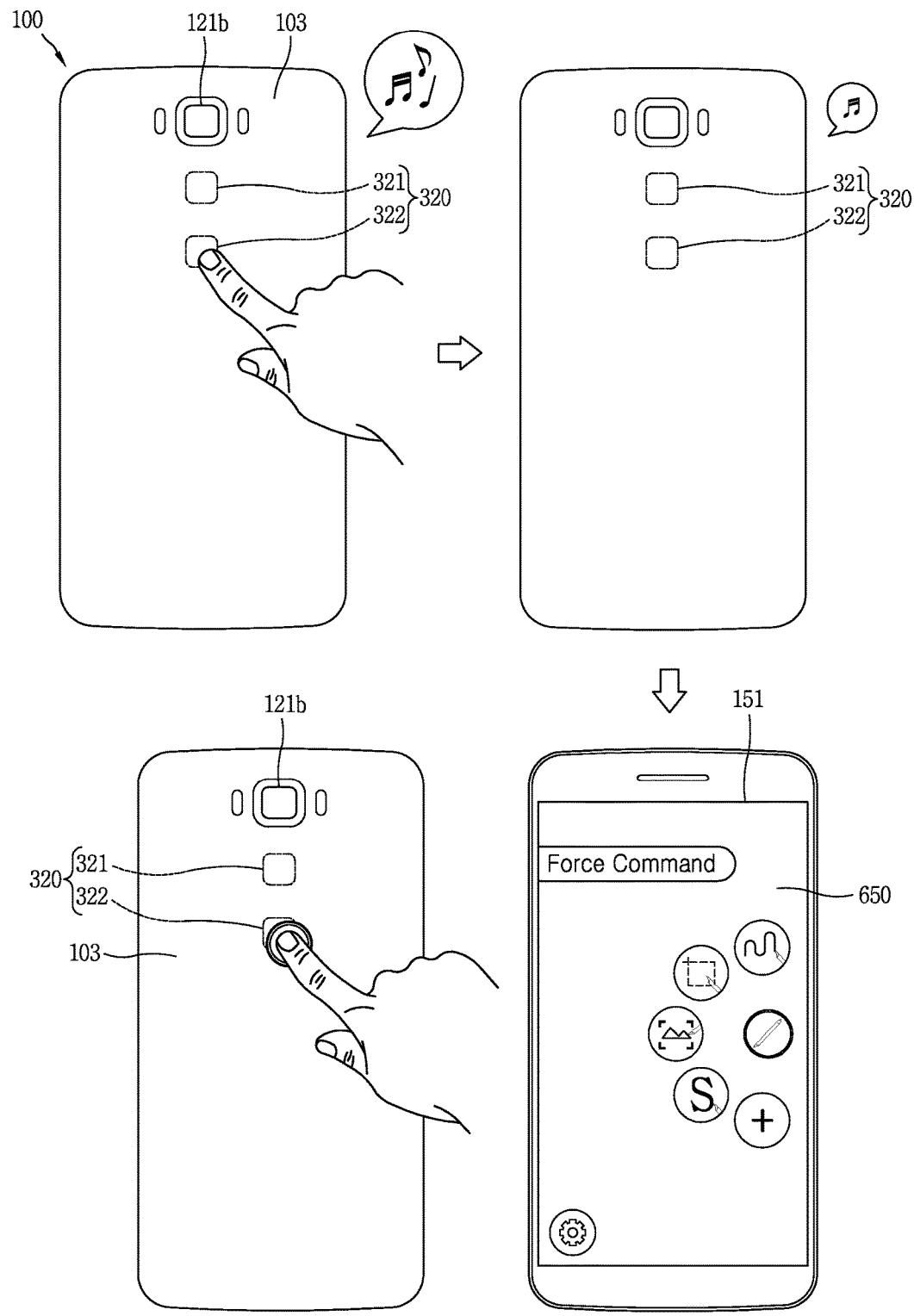
FIGS. 6A to 6C are conceptual views illustrating a control method of executing a different function based on a sensed pressure level, according to another embodiment of the present invention.
Figure 6B:
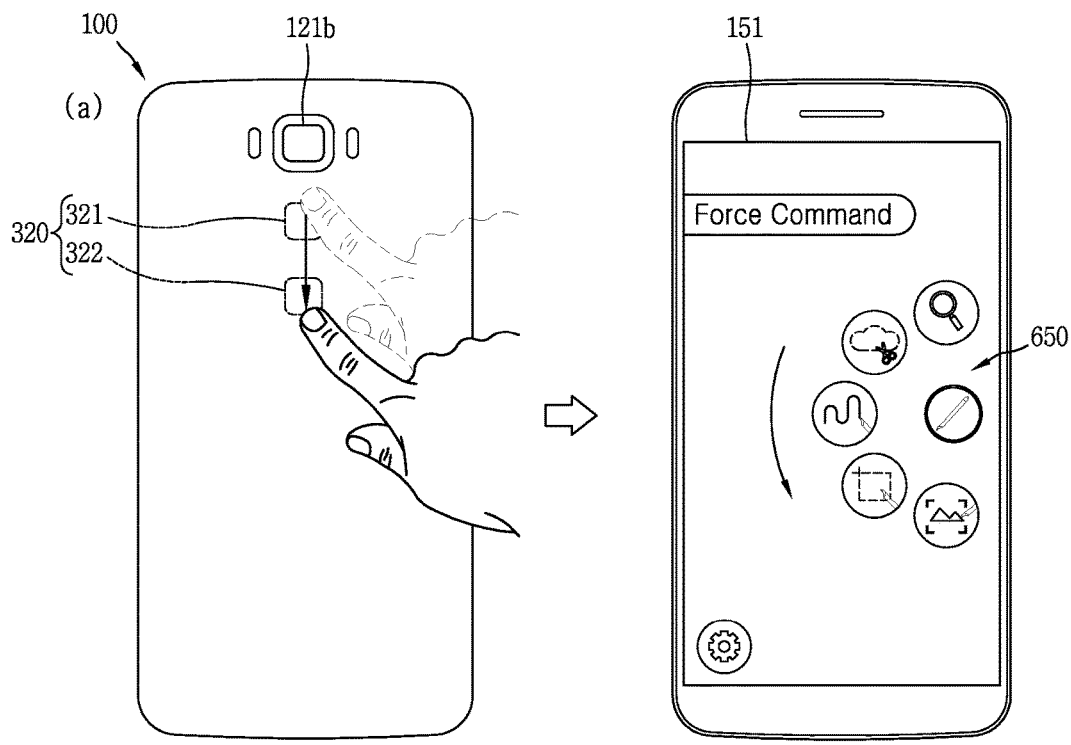
Figure 6B:
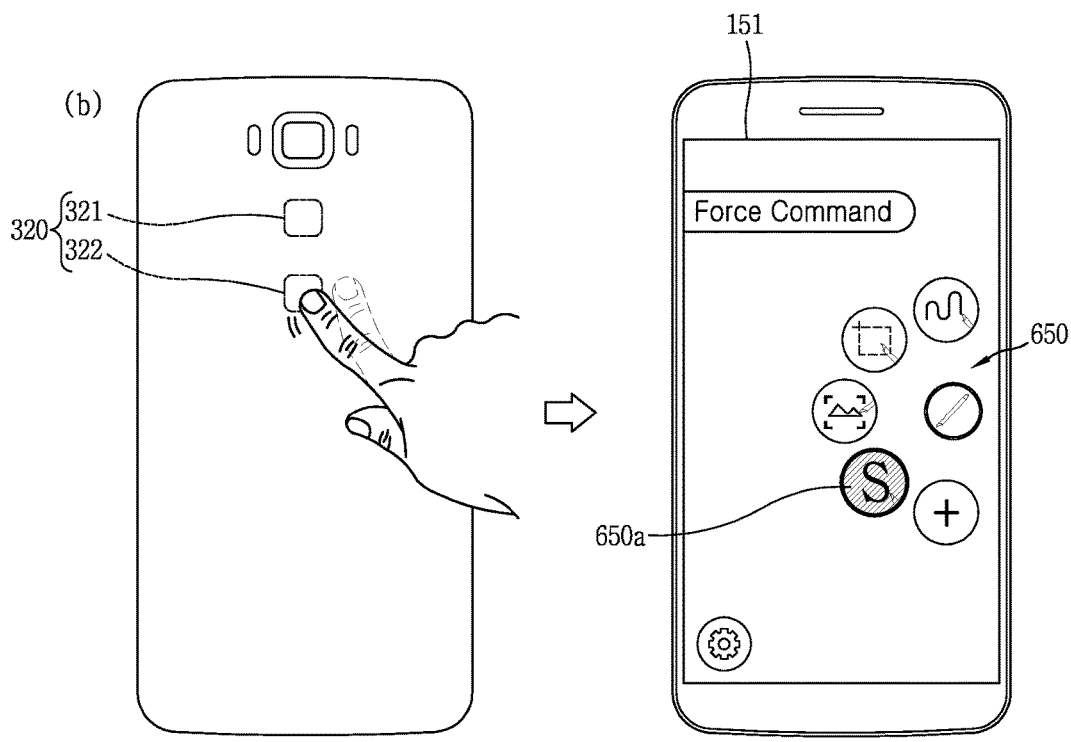
Figure 6C:
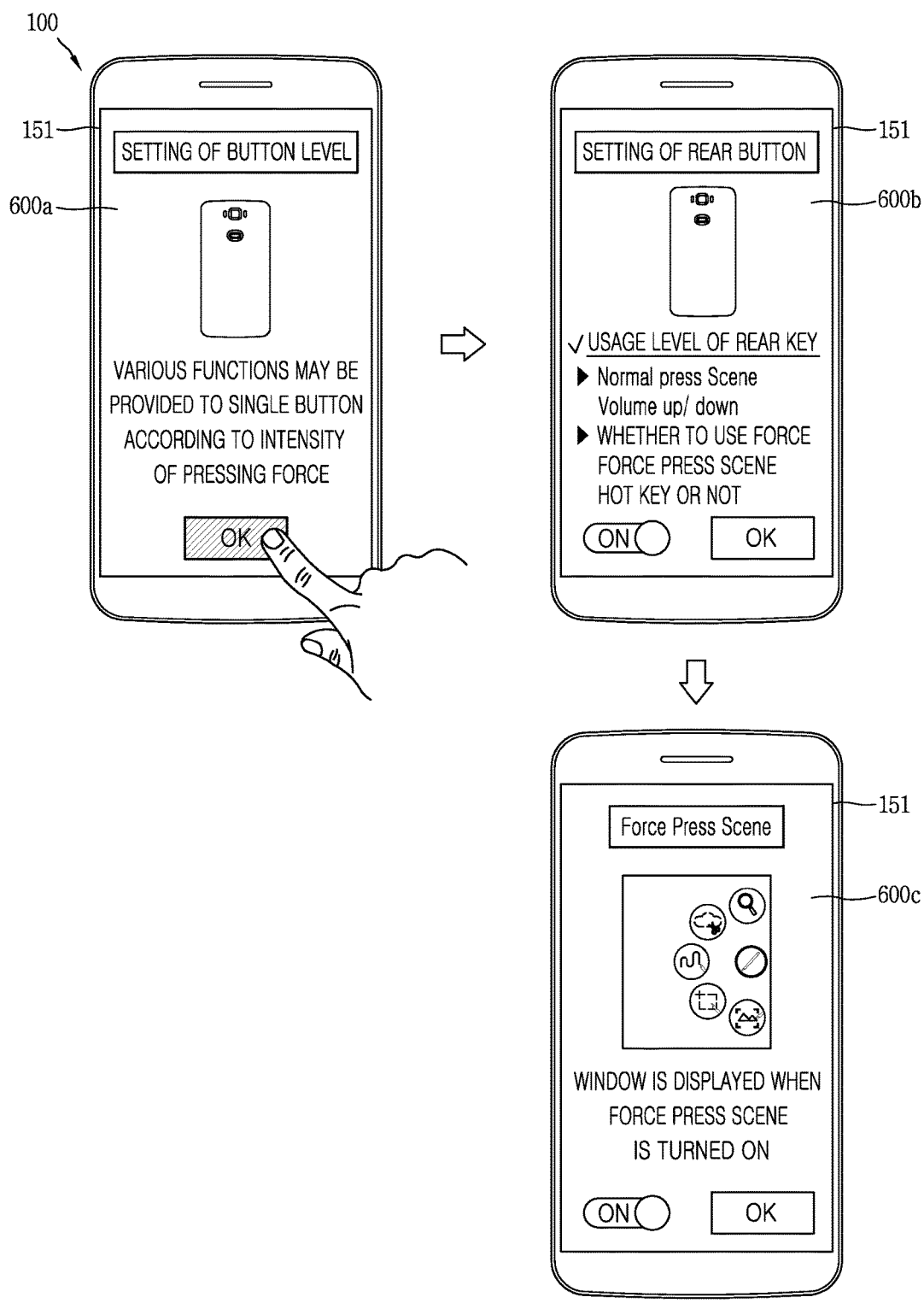

FIGS. 6A to 6C are conceptual views illustrating a control method of executing a different function based on a sensed pressure level, according to another embodiment of the present invention.

In the mobile terminal 100 of FIG. 6A, the second manipulation unit 123b disposed on the rear cover 103 is not provided. That is, the mobile terminal 100 according to this embodiment includes a second metal key unit 320 composed of first and second metal keys 321, 322, formed on one region of the rear cover 103. The first and second metal keys 321, 322 may be disposed to be adjacent to each other. The first and second metal keys 321, 322 are configured to sense a pressure of a preset level.

When a pressure of a first level is sensed by at least one of the first and second metal keys 321, 322, the controller 180 may control the audio output unit 152 to control a sound volume. In this case, the controller 180 may change a notification mode based on the pressure of the first level.

If a pressure of a second level larger than the first level is sensed by at least one of the first and second metal keys 321, 322, the controller 180 controls the display unit 151 to output a fifth function image 650.

The fifth function image 650 may include one or more icons for execution of one or more preset applications. The fifth function image 650 is displayed on one region of the display unit 151, regardless of screen information which was being output to the display unit 151.

In this embodiment, a user may control a preset general driving of the mobile terminal by applying a pressure of a low level, and may display a function image which executes a specific application, more rapidly by applying a pressure of more than a specific level.

Referring to FIG. 6B, the controller 180 controls the fifth function image 650 by sensing a pressure applied to the first and second metal keys 321, 322.

Referring to FIG. 6B(a), when a pressure is sequentially applied to the first and second metal keys 321, 322, the controller 180 controls the display unit 151 to change the fifth function image 650. For instance, in a case where a plurality of icons are arranged to surround a specific point as the fifth function image 650, if a pressure is sequentially applied to the first and second metal keys 321, 322, the controller 180 may control the icons to rotate on the basis of the specific point such that some of the icons may disappear and other icons may be displayed.

When a plurality of pressures are pressed within a specific time by the first metal key 321 or the second metal key 322, the controller 180 selects one of the plurality of icons which constitute the fifth function image 650. The display unit 151 may highlight the selected icon. The controller 180 may execute an application corresponding to the selected icon.

In this embodiment, a specific function may be executed as a pressure is sequentially applied to the metal keys disposed to be adjacent to each other, or a specific function may be executed as a plurality of pressures are applied within a specific time. Thus, a user needs not apply a touch input to the display unit 151 in order to output the fifth function image or in order to control the fifth function image 650 being output.

FIG. 6C illustrates a setting screen to set a control using a metal key, and a control based on a pressure applied to the metal key.

The mobile terminal may be set to execute a different function based on a pressure applied to a metal key, by a first setting screen 600a. Whether to control different functions by a normal pressure and a force pressure is set by a second setting screen 600b. An output method of the fifth function image 650, and icons included in the fifth function image 650 may be set by a third setting screen 600c.

That is, a user may determine whether to use the metal key or not, and may set a function according to a level of a pressure applied to the metal key.

Figure 7A:
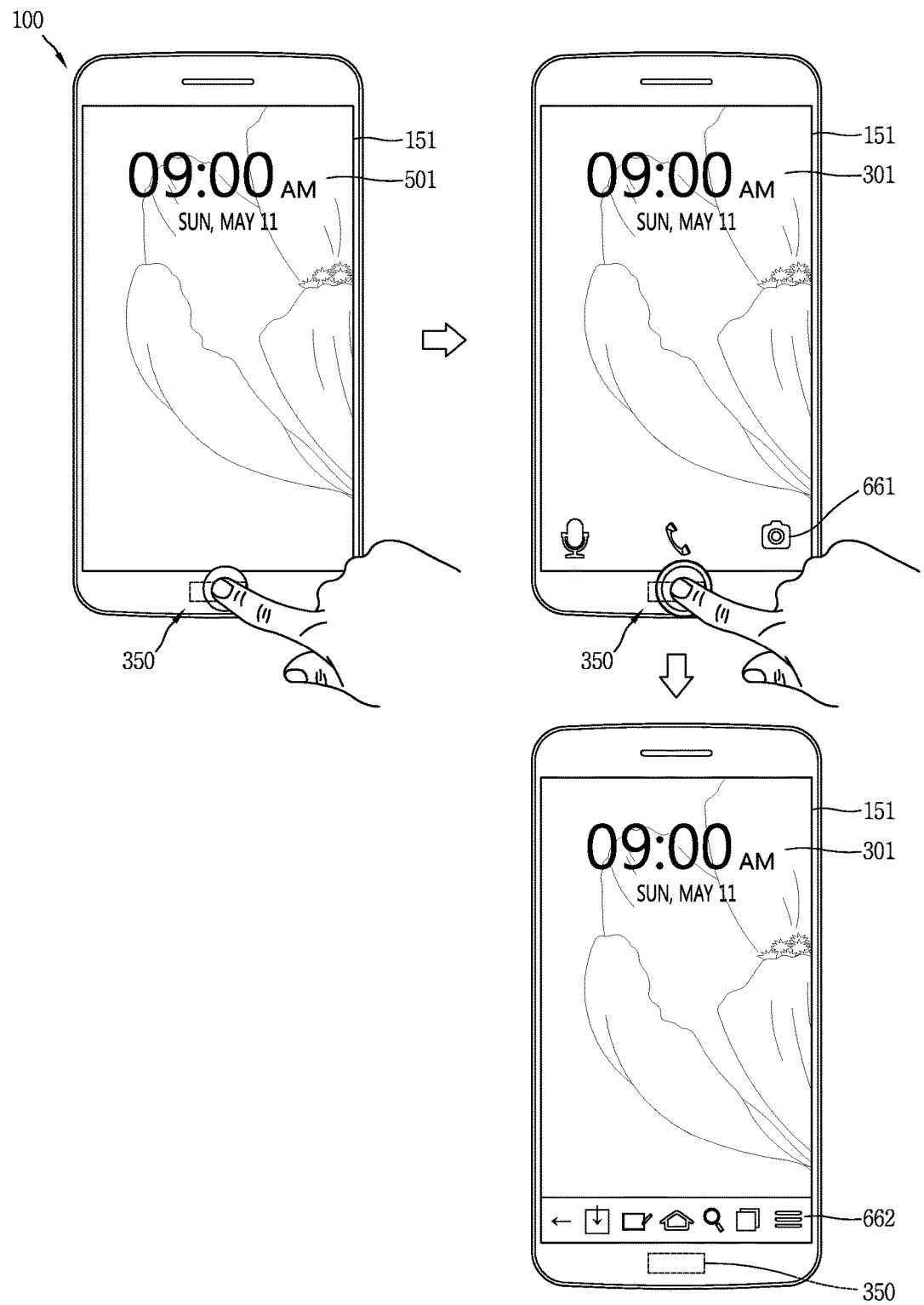
FIGS. 7A and 7B are conceptual views illustrating a method of controlling a mobile terminal by using another metal key.
Figure 7B:
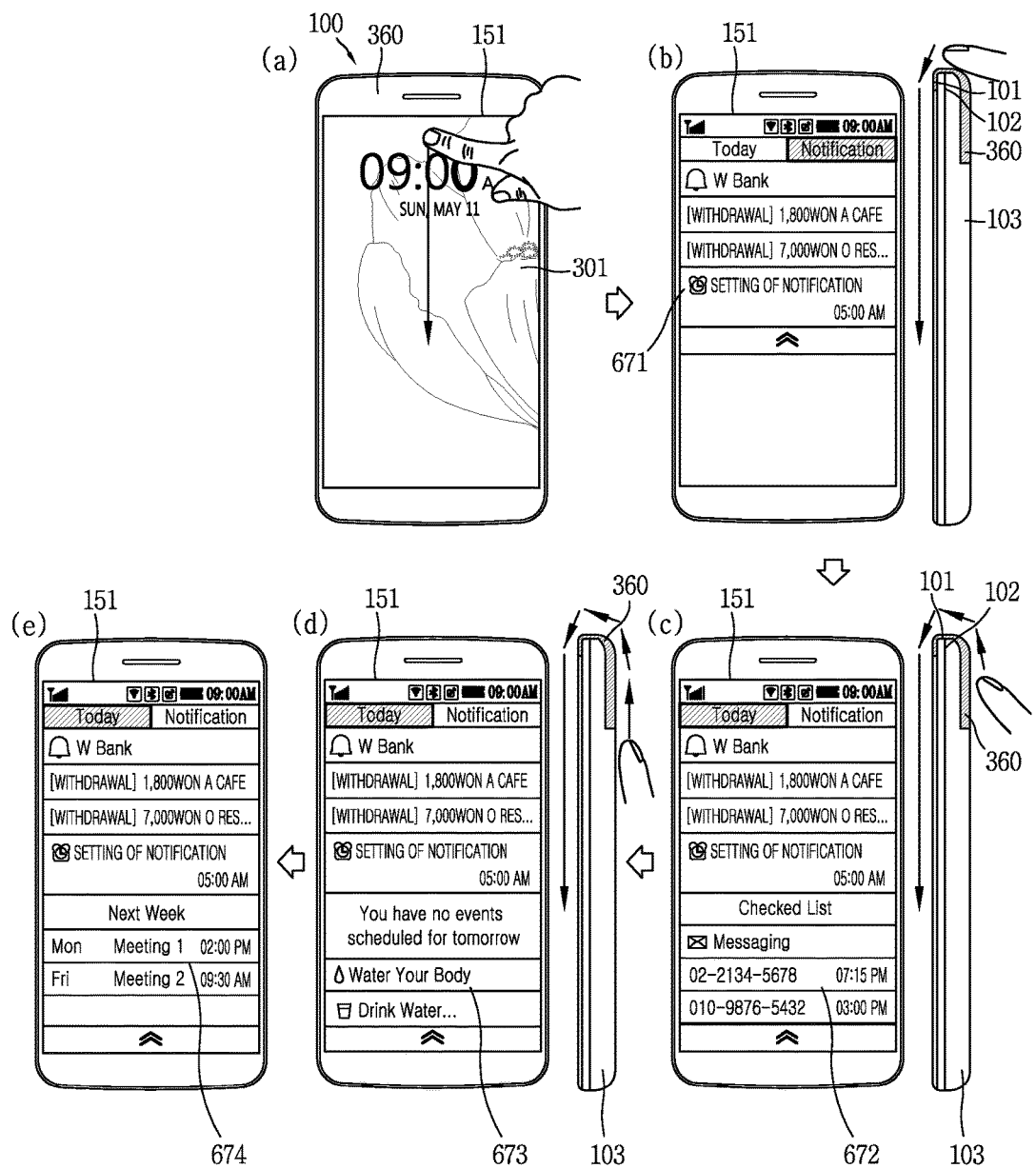

FIGS. 7A and 7B are conceptual views illustrating a method of controlling the mobile terminal by using another metal key.

The mobile terminal 100 of FIG. 7A does not include a user input unit formed on one surface of the body of the mobile terminal where the display unit 151 is formed. The mobile terminal 100 according to this embodiment includes a fifth metal key unit 350 formed at a bezel portion adjacent to an edge of the display unit 151.

The controller 180 outputs a first menu image 661 based on a pressure of a first level applied to the fifth metal key unit 350. When a pressure of a second level larger than the first level is applied to the fifth metal key unit 350, the controller 180 controls the display unit 151 to output a second menu image 662. The first and second menu images 661, 662 may be selectively output, and may be displayed on the same region of the display unit 151.

The first and second menu images 661, 662 include different number of icons or different types of icons. For instance, when the first menu image 661 includes a basic icon, the second menu image 662 may include an icon of an application frequently used by a user, an icon of an application being currently executed, etc. Alternatively, the second menu image 662 may include for specific functions. For instance, the second menu image 662 may include icons to execute multimedia functions.

When a pressure of a third level larger than the second level is sensed, the controller controls the display unit 151 to display a menu image including other types of icons or icons of other shapes.

When a pressure of a larger level is sensed by the metal key, the controller 180 may control the display unit 151 to enlarge the menu image.

In this embodiment, even if a button type or touch type user input unit is not formed close to the display unit 151, basic icons may be output as a metal key is formed on the case formed of a metallic material. And a menu image of a user's desired type and shape may be displayed based on a pressure applied to the mobile terminal.

The mobile terminal of FIG. 7B includes a sixth metal key unit 360 which extends from the edge of the display unit to side surfaces and a rear surface of the mobile terminal 100. For instance, the sixth metal key unit 360 extends from an upper bezel portion to one region of the rear case 102 and one region of the rear cover 103. The sixth metal key unit 360 may be composed of a plurality of metal keys disposed sequentially.

The sixth metal key unit 360 senses a user's touch input based on a pressure change. The sixth metal key unit 360 is configured to sense a pressure. However, for convenience, it will be understood that the sixth metal key unit 360 senses a touch input.

The controller 180 may control the display unit 151 to output a first state notification screen 671, based on a first dragging touch input applied from an upper end of the display unit 151. The first dragging touch input is firstly applied to an uppermost region of the display unit 151, and is released at an intermediate region of the display unit 151. The first state notification screen 671 includes information on a current driving state of the mobile terminal (e.g., a screen brightness, a communication state, a notification mode, etc.), and information on an occurred event.

The controller 180 may control the display unit 151 to output a second state notification screen 672, based on a second dragging touch input firstly applied to a first region of the sixth metal key unit 360 and consecutively applied to a middle region of the display unit 151. The second state notification screen 672 includes information on an event deleted after a notification thereof has occurred. The first state notification screen 671 includes only information on events not checked by a user among occurred events. For instance, the first region may be a region of the second case, a side surface of the mobile terminal 100.

The controller 180 may control the display unit 151 to output a third state notification screen 673, based on a third dragging touch input firstly applied to a second region of the sixth metal key unit 360 and consecutively applied to a middle region of the display unit 151. The third state notification screen 673 may include information on all events which have occurred on the day. All of the events which have occurred on the day are unrelated to whether they have been checked by a user or not. For instance, the second region may be a region of the sixth metal key unit 360 formed at the rear cover 103.

A fourth state notification screen 674 is output based on a fifth dragging touch input firstly applied to a third region of the sixth metal key unit 360 and released at a middle region of the display unit 151, the third region closer to a central part of the rear cover 103 than the second region. The fourth state notification screen 674 may be set to include information on all events which have occurred during a specific period (e.g., this week).

That is, based on a dragging touch input consecutively applied to the sixth metal key unit 360 and the display unit 151, executed is the same function based on a dragging touch input applied to the display unit 151. However, information provided by the dragging touch input consecutively applied to the sixth metal key unit 360 and the display unit 151, may be different from information provided by the dragging touch input applied to the display unit 151. Different information may be provided according to a touch application range onto the sixth metal key unit 360.

In this embodiment, a user may be provided with a desired range of information by applying a different range to the same function.

FIGS. 8A to 8E are conceptual views illustrating a control method using a seventh metal key unit disposed on side surfaces of the mobile terminal.

The mobile terminal 100 according to the present invention includes a seventh metal key unit 370 formed on two side surfaces facing each other and configured to sense a pressure. The seventh metal key unit 370 may extend from a bezel portion which encloses the display unit 151, to one region of the rear case 102. The seventh metal key unit 370 may sense a pressure change of a user's touch input firstly applied to the display unit 151 and then consecutively applied to the seventh metal key unit 370.

Figure 8A:
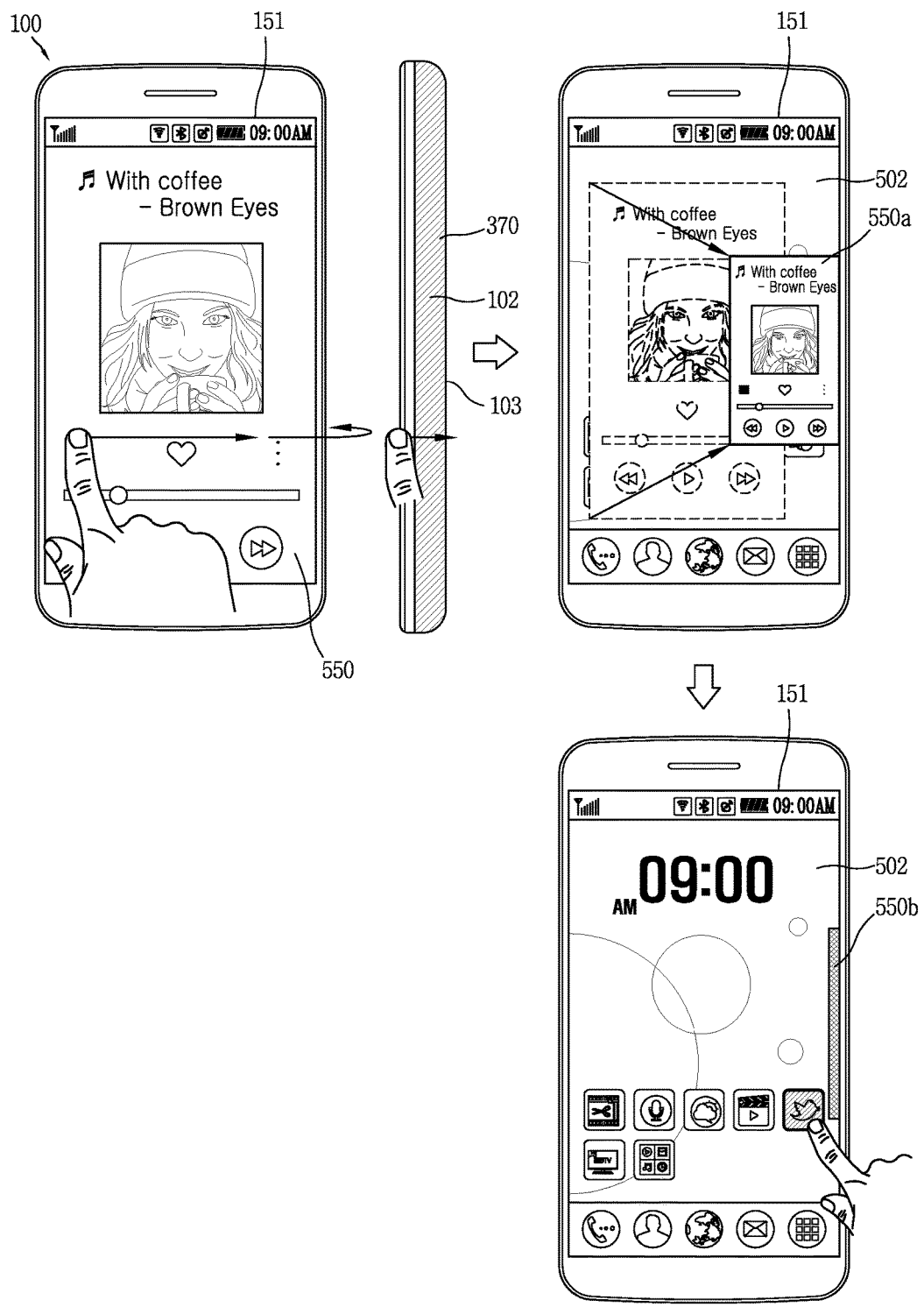

Referring to FIG. 8A, the display unit 151 outputs fifth screen information 550, an execution screen of a specific application. The controller 180 controls the memory 170 to store information of the specific application, based on a touch input firstly applied to the display unit 151 and then consecutively applied to the seventh metal key unit 370.

Once the touch input is sensed by the seventh metal key unit 370, the display unit 151 moves a movable image 550a of the fifth screen information 550, to a region where the touch input has been applied. The movable image 550a corresponds to an image which disappears to an edge region of the display unit 151 after being gradually decreased in size from the fifth screen information 550. While the movable image 550a gradually disappears, the display unit 151 displays an indicator 550b on the edge region of the display unit 151. The edge region corresponds to a region adjacent to the seventh metal key unit 370 which senses the touch input.

While the fifth screen information 550 is changed into the movable image 550a, the display unit 151 may output other screen information 502 overlapped with the movable image 550a. Said other screen information 502 may be a home screen page including one or more icons.

Figure 8B:
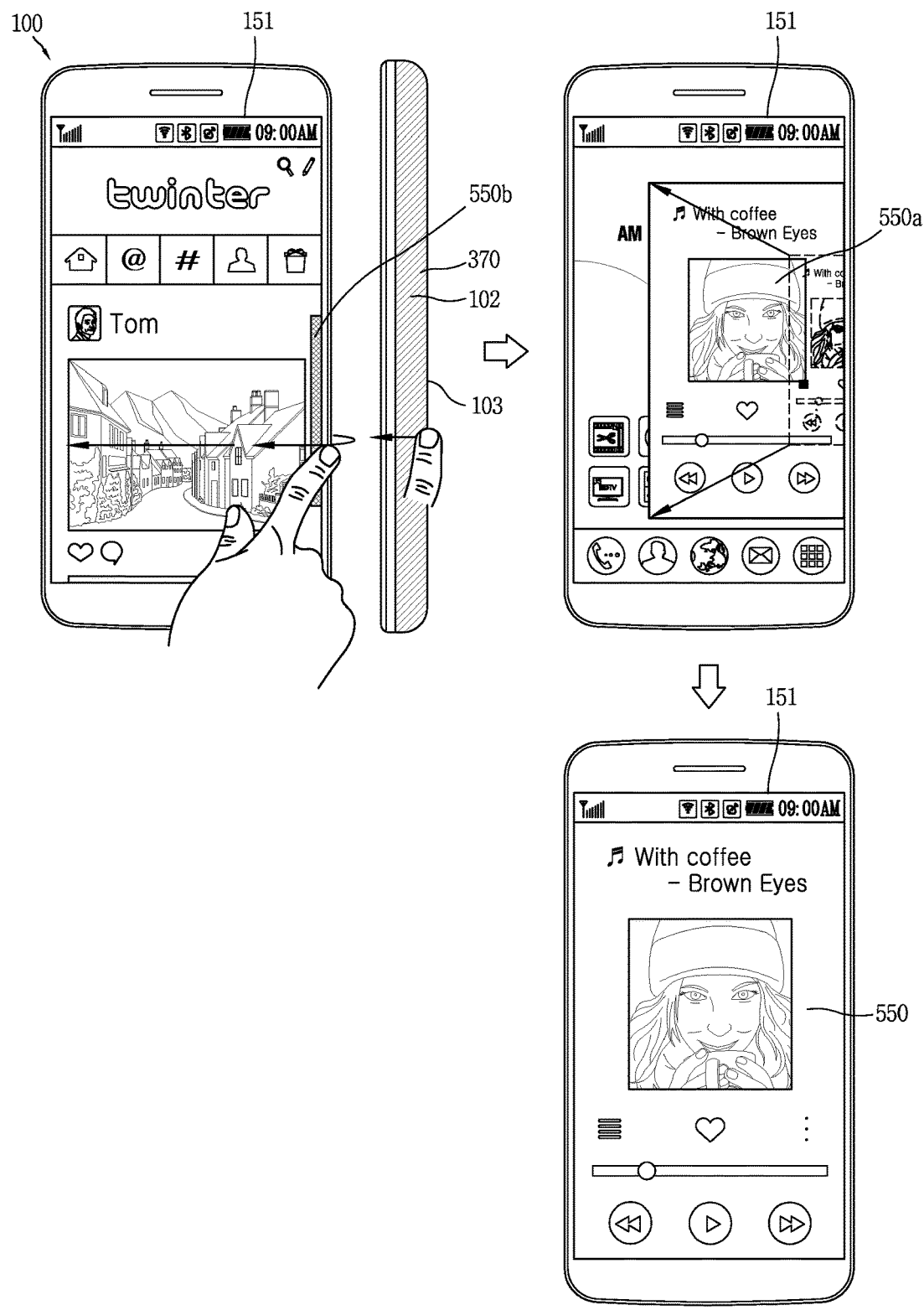

Referring to FIG. 8B, the controller 180 may output the fifth screen information 550, based on a touch input consecutively applied to the seventh metal key unit 370 and the display unit 151. The touch input may be applied to the indicator 550b, but the present invention is not limited to this.

The controller 180 may control the display unit 151 not to output the indicator 550b. Once a touch input applied to the seventh metal key unit 370 is sensed, in a non-output state of the indicator, the controller 180 controls the display unit 151 to output the fifth screen information 550. In this embodiment, a user may temporarily store an application being executed by applying a touch input to the seventh metal key unit 370, and may re-execute the application by using the seventh metal key unit 370.

Referring to FIG. 8C, will be explained a control method of temporarily storing a plurality of applications. The controller 180 controls the memory to store execution information of applications corresponding to first to third screen information 551, 552, 553, based on a touch input applied to the display unit 151 and the seventh metal key unit 370, while the first to third screen information 551, 552, 553 are being displayed on the display unit 151.

The display unit 151 may output indicators corresponding to information on the applications stored temporarily, but the present invention is not limited to this. That is, a user may remember a touch input applied to a specific region of the seventh metal key unit 370, and may apply the touch input again.

Once a touch input is consecutively applied to the seventh metal key unit 370 and the display unit 151, the controller 180 controls the display unit 151 to output a first restoration window 681. The first restoration window 681 may include icons of applications corresponding to the first to third screen information 551, 552, 553. In this case, thumbnail images indicating the first to third screen information 551, 552, 553, etc. may be displayed instead of the icons.

The controller 180 executes a corresponding application based on a touch input applied to one of the icons, and outputs an executions screen. The controller 180 executes the application based on stored execution information on the application. The display unit 151 may output the first screen information 551.

In this embodiment, a user may temporarily store a state of an application while executing the application. In this case, if other application is being executed, the user may convert said other application to the previous application.

Figure 8D:
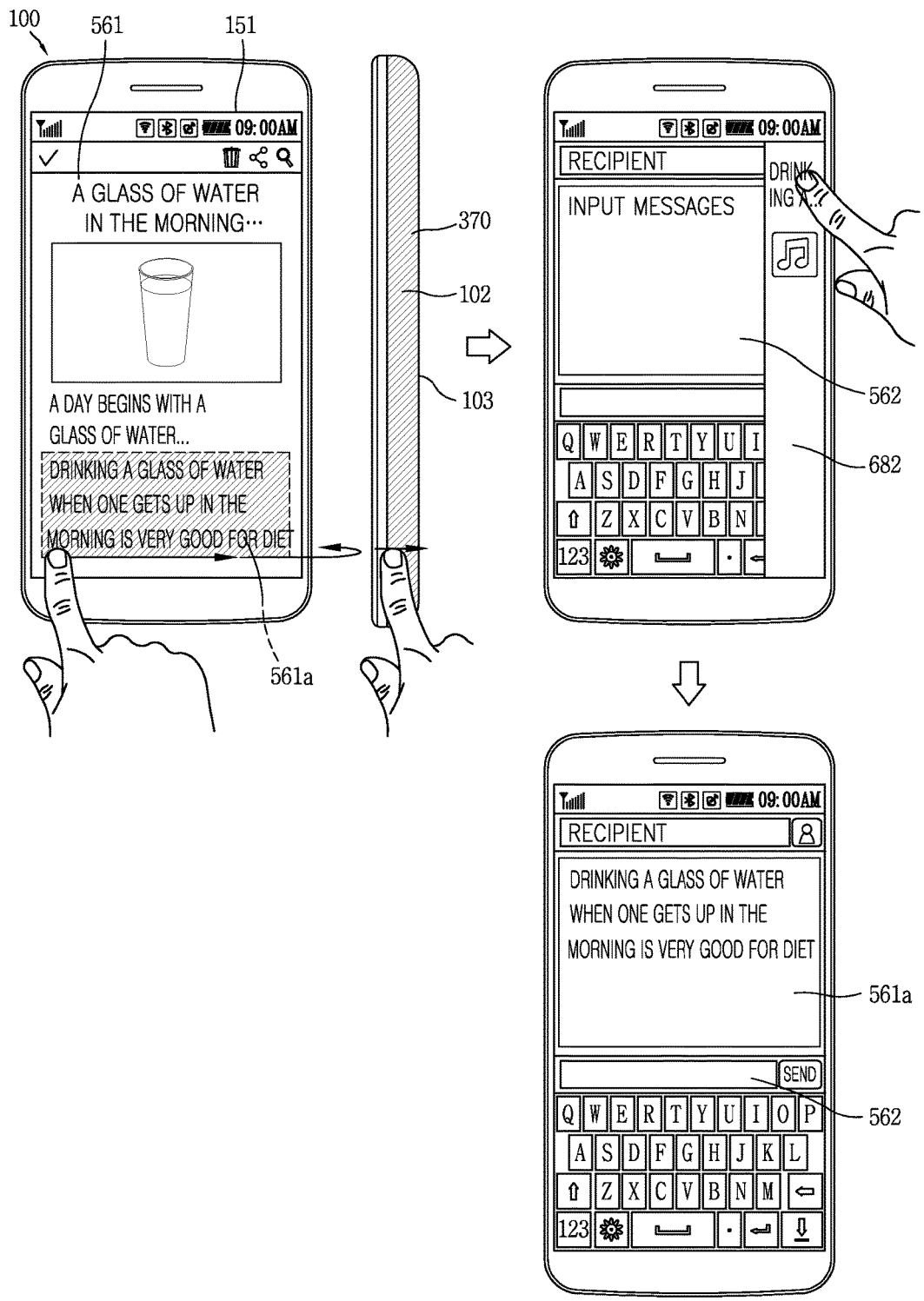

Referring to FIG. 8D, the display unit 151 outputs a first execution screen 561 including a plurality of contents. One or more of the plurality of contents included in the first execution screen 561 are selected based on a touch input applied to the first executions screen 561. The selected content may be highlighted.

When a touch input applied to the display unit 151 and the seventh metal key unit 370 is sensed in the selected state of the content, the controller 180 controls the memory to store the selected contents therein. While the content is stored in the memory 170, the first execution screen 561 is continuously output. Once the content is stored in the memory 170, the controller 180 controls the display unit 151 such that the highlight effect provided to the content disappears.

When said other application is executed based on a user's control command, a second execution screen 562 is output. For instance, the second execution screen 562 may correspond to an execution screen for a message application, a memo application, etc. which enable an input of contents.

The controller 180 controls the display unit 151 to output a second restoration window 682, based on a touch input sensed by the seventh metal key unit 370. The second restoration window 682 includes graphic images indicating some contents stored in the memory 170. The graphic images may be icons, texts, thumbnail images, etc.

The second restoration window 682 may include graphic images indicating stored contents, and icons indicating execution information of stored applications.

The controller 180 controls the display unit 151 to display a selected content on the second execution screen 562, based on a touch input applied to the second restoration window 682. Once the selected content is displayed on the second execution screen 562, the memory 170 may delete the stored content, and the selected content may disappear from the second restoration window 682.

Figure 8E:
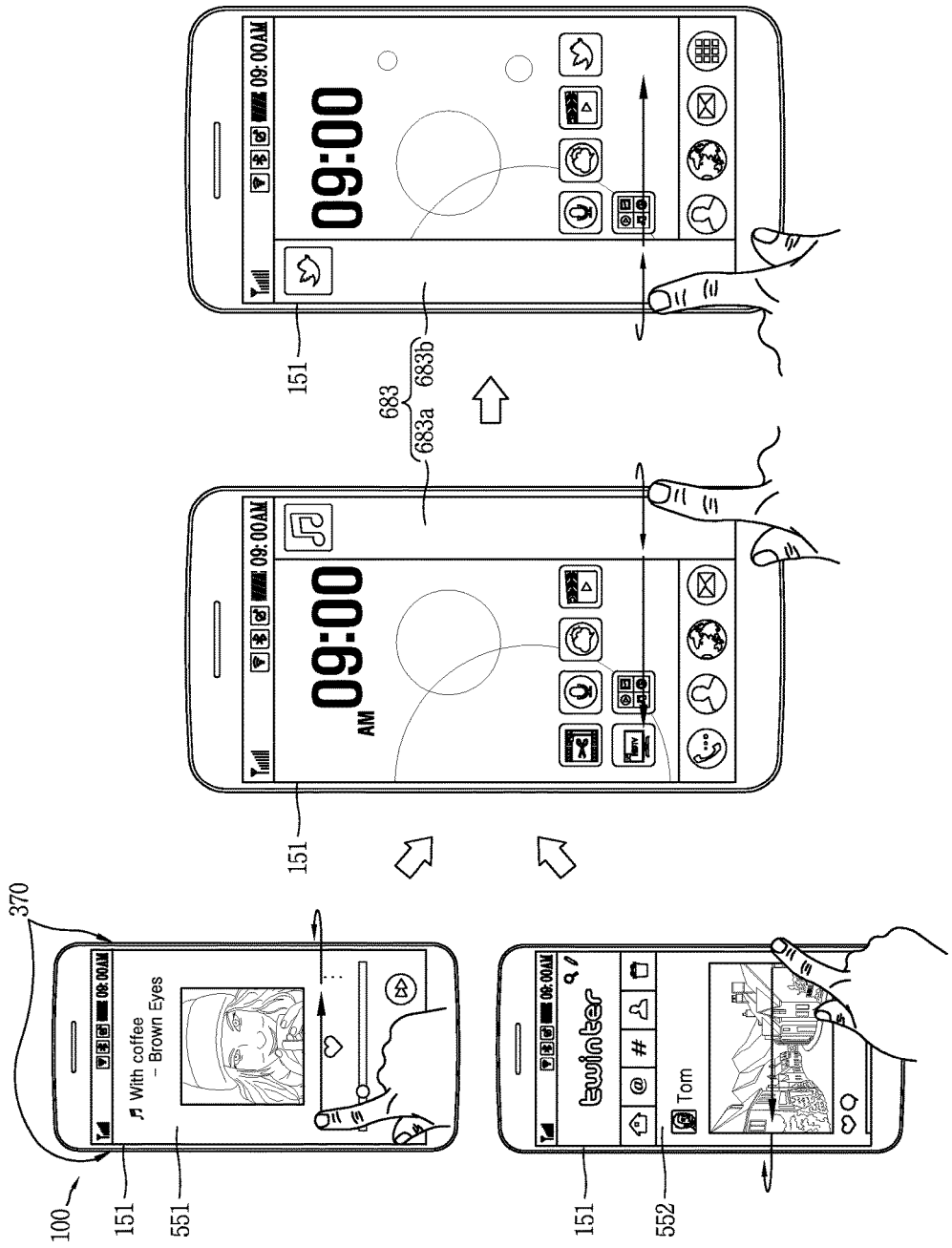

Referring to FIG. 8E, a third restoration window 683 is displayed on a different region on the display unit 151, based on a touch input applied to one of first and second metal keys of the seventh metal key unit 370 formed on two side surfaces of the mobile terminal 100.

While the first screen information 551 is being output to the display unit 151, if a touch input is applied to the first metal key disposed on a right region of the display unit 151, the controller 180 controls the memory 170 to store therein information related to the first screen information 551. While the second screen information 552 is being output to the display unit 151, if a touch input is applied to the second metal key disposed on a left region of the display unit 151, the controller 180 controls the memory 170 to store therein information related to the second screen information 552.

Once a touch input is applied to the first metal key disposed on the right region of the display unit 151, the third restoration window 683a is output to the right region of the display unit 151. Likewise, once a touch input is applied to the second metal key disposed on the left region of the display unit 151, the third restoration window 683b is output to the left region of the display unit 151. That is, a user may store and restore related information by selectively using one of the first and second metal keys of the seventh metal key unit 370, the metal key formed at a region adjacent to one edge of the display unit 151.

Figure 9A:
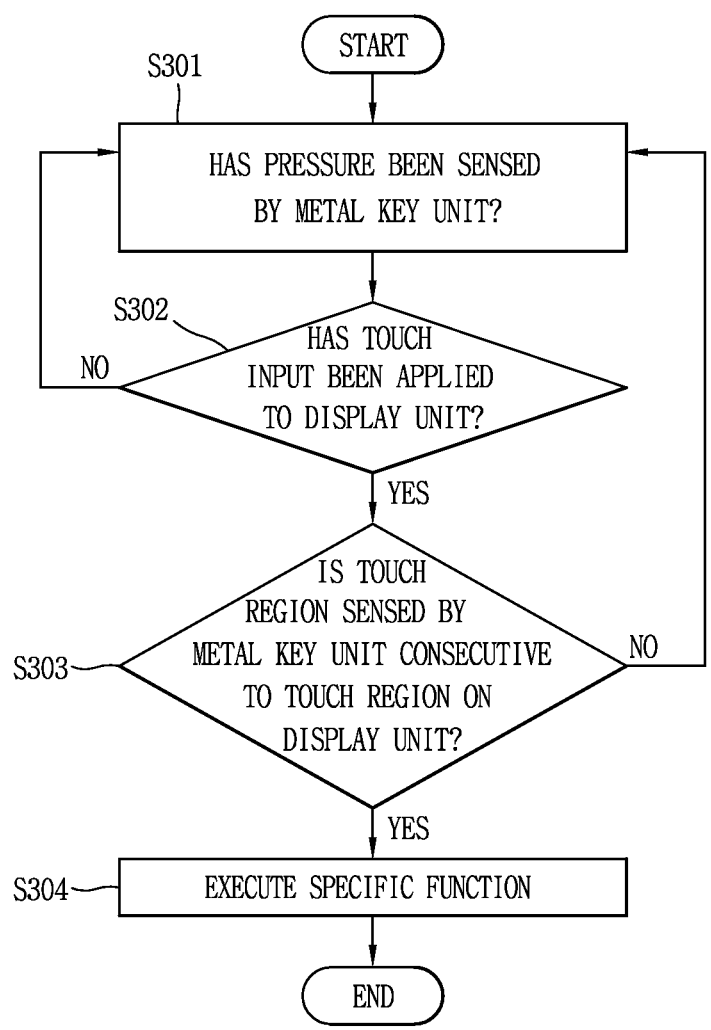
FIGS. 9A and 9B are conceptual views illustrating a method of executing a specific function by distinguishing a grip and a touch input from each other.
Figure 9B:
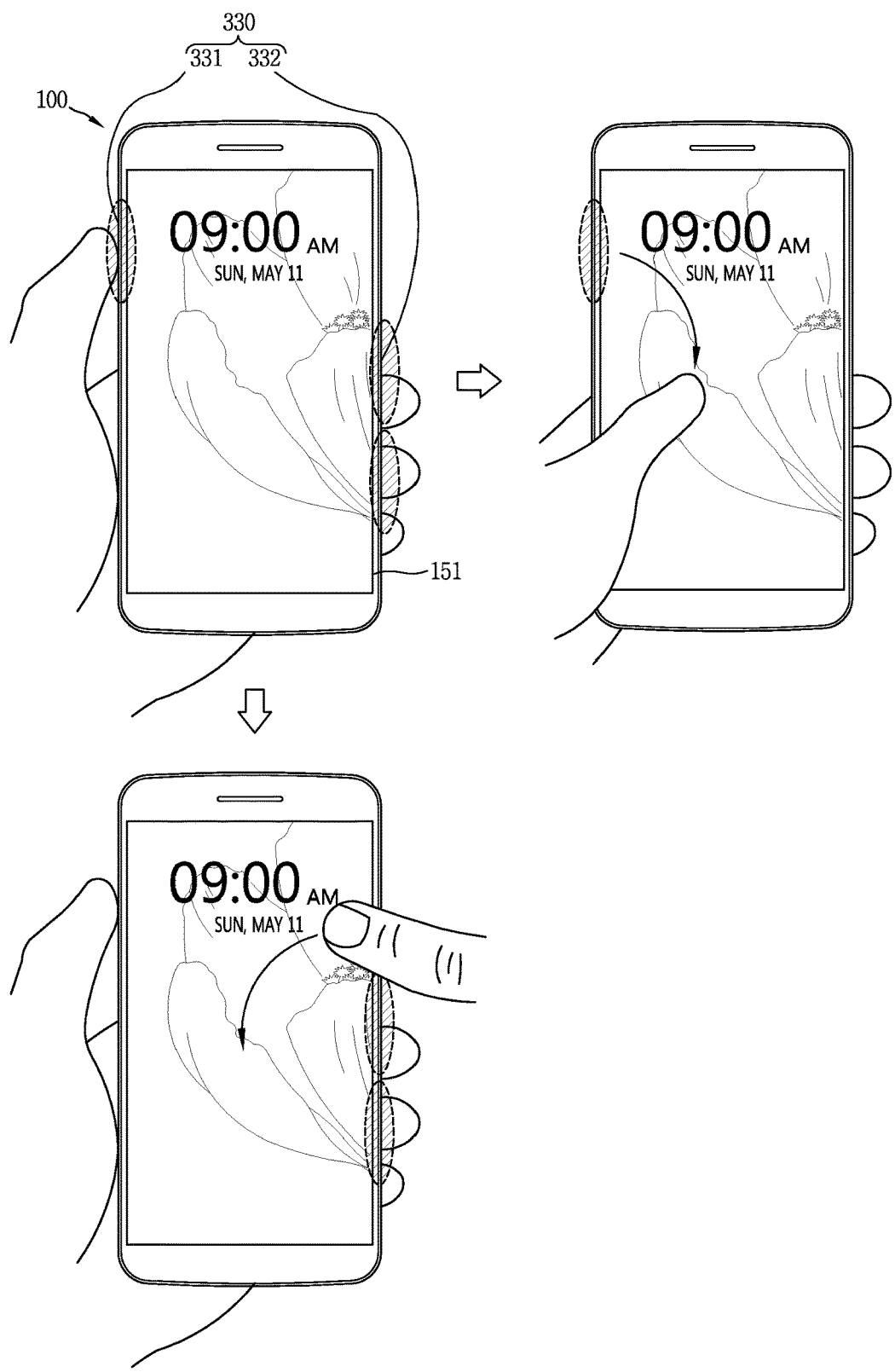

FIGS. 9A and 9B are conceptual views illustrating a method of executing a specific function by distinguishing a grip and a touch input from each other.

Referring to FIGS. 9A and 9B, a metal key unit formed on an outer surface of the mobile terminal 100 may sense a pressure even while a user is holding the mobile terminal 100. A pressure of the hand of the user who is holding the mobile terminal 100 may be sensed by at least one metal key included in the metal key unit.

The metal key unit senses a pressure (S301). Once a movement of the mobile terminal 100 is sensed by a specific sensor for sensing a movement of the mobile terminal 100, or once a change of a position of the mobile terminal 100 is sensed, the controller 180 may activate the metal key unit.

While the pressure is sensed by the metal key unit, it is determined whether a touch input has been applied to the display unit 151 or not (S302). If no touch input has been applied to the display unit 151, the pressure sensed by the metal key unit is ignored.

While the pressure is sensed by the metal key unit, if a touch input applied to the display unit 151 is sensed, the controller 180 determines whether a touch input applied to the display unit 151 is consecutive to a touch input sensed by the metal key unit (S303).

Referring to FIG. 9B, the mobile terminal 100 includes the third metal key unit 330 including the first and second metal keys 331, 332. While a user holds the mobile terminal 100, the first and second metal keys 331, 332 sense a pressure by the hand of the user. The user may apply a touch input to the display unit 151 while holding the mobile terminal (i.e., while the pressure is being sensed by the third metal key unit 330).

Upon sensing of a touch input which moves from one region of the display unit 151 adjacent to one region of the first metal key 331, the controller 180 executes a preset function (S304).

However, in a case where a touch region on the display unit 151 is not connected to a touch region sensed by the metal key, the controller prevents execution of the preset function, and controls the mobile terminal 100 only based on the touch input applied to the display unit 151.

In this embodiment, an intentional input using the metal keys, and a normal pressure applied in order to support (hold) the mobile terminal are distinguished from each other. This may prevent execution of an unintended function.

In a case where the metal keys are formed at regions adjacent to the edges of the display unit 151, the controller 180 may control a reference pressure value used to determine a touch input. For instance, when a touch input is firstly applied to the display unit 151 and then is consecutively applied to the metal keys, the controller 180 may lower the reference pressure value and may control a period to sense a pressure to be short.

As another example, when a touch input is firstly applied to the metal keys and then is applied to the display unit 151, the controller may increase the reference pressure value and may control a period to sense a pressure to be long.

With such a configuration, the mobile terminal senses a touch input more precisely when a user applies a control command intentionally, and does not sense a touch input when a normal pressure to support the mobile terminal is applied, or when the mobile terminal contacts other object. Accordingly, noise may be minimized.

FIGS. 10A to 10D are conceptual views illustrating a method of executing a different function according to a region of a metal key which senses a pressure of a touch input.

Figure 10A:
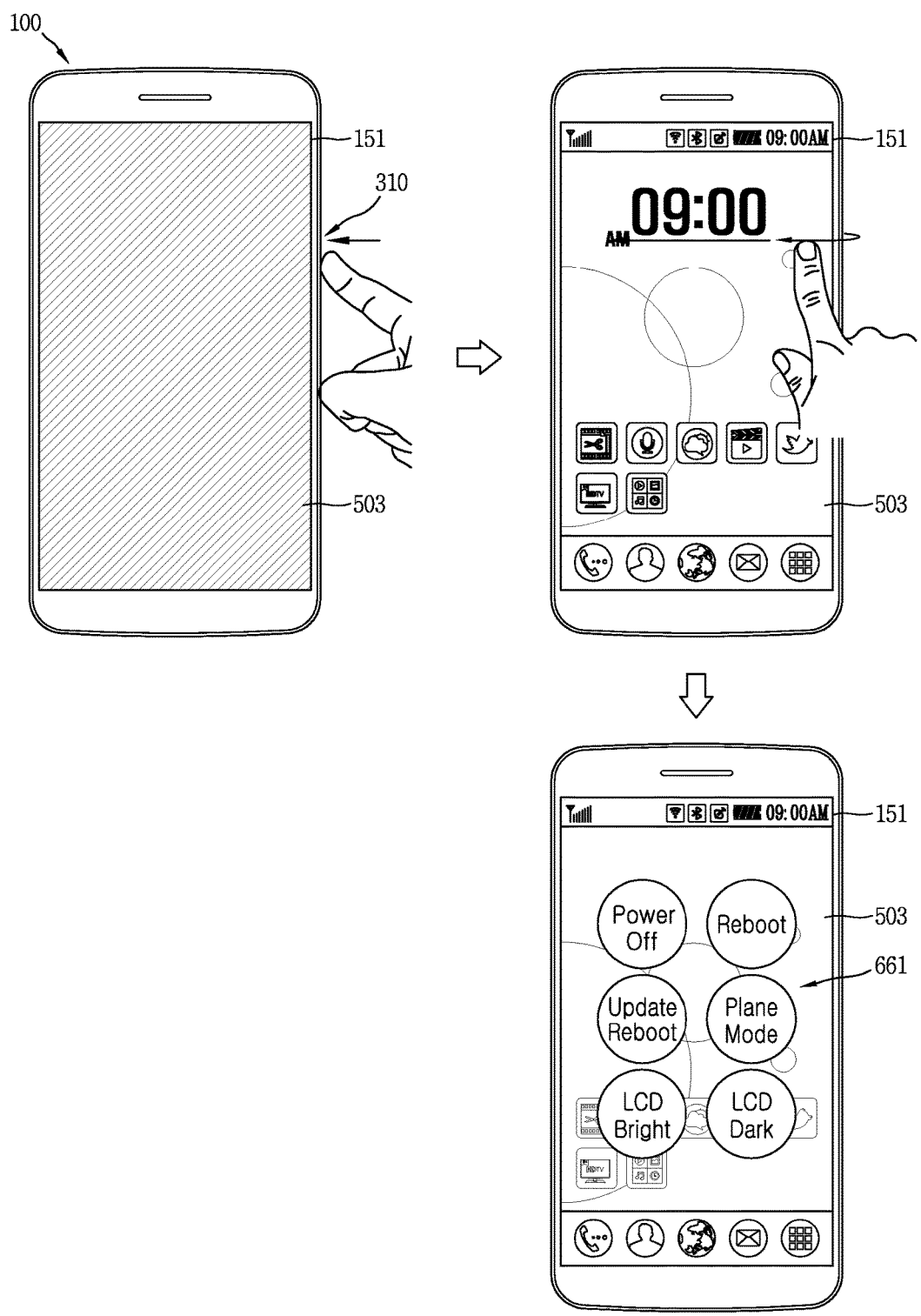
FIGS. 10A to 10D are conceptual views illustrating a method of executing a different function according to a region of a metal key which senses a pressure of a touch input.

The mobile terminal 100 of FIG. 10A includes a first metal key unit 310 formed on a side surface of the body of the mobile terminal 100. The controller 180 controls an on/off state of the display unit 151 when a pressure is applied to the first metal key unit 310. The controller 180 turns on/off a power of the mobile terminal when a pressure applied to the first metal key unit 310 is maintained for more than a specific time (more than several seconds).

The controller 180 controls the display unit 151 to output a mode change screen 661, based on a touch input firstly applied to the first metal key unit 310 and then consecutively applied to one region of the display unit 151. The mode change screen 661 may include at least one graphic image to which a touch input is applied for change of a driving mode of the mobile terminal 100, or for change of a power control state.

Figure 10B:
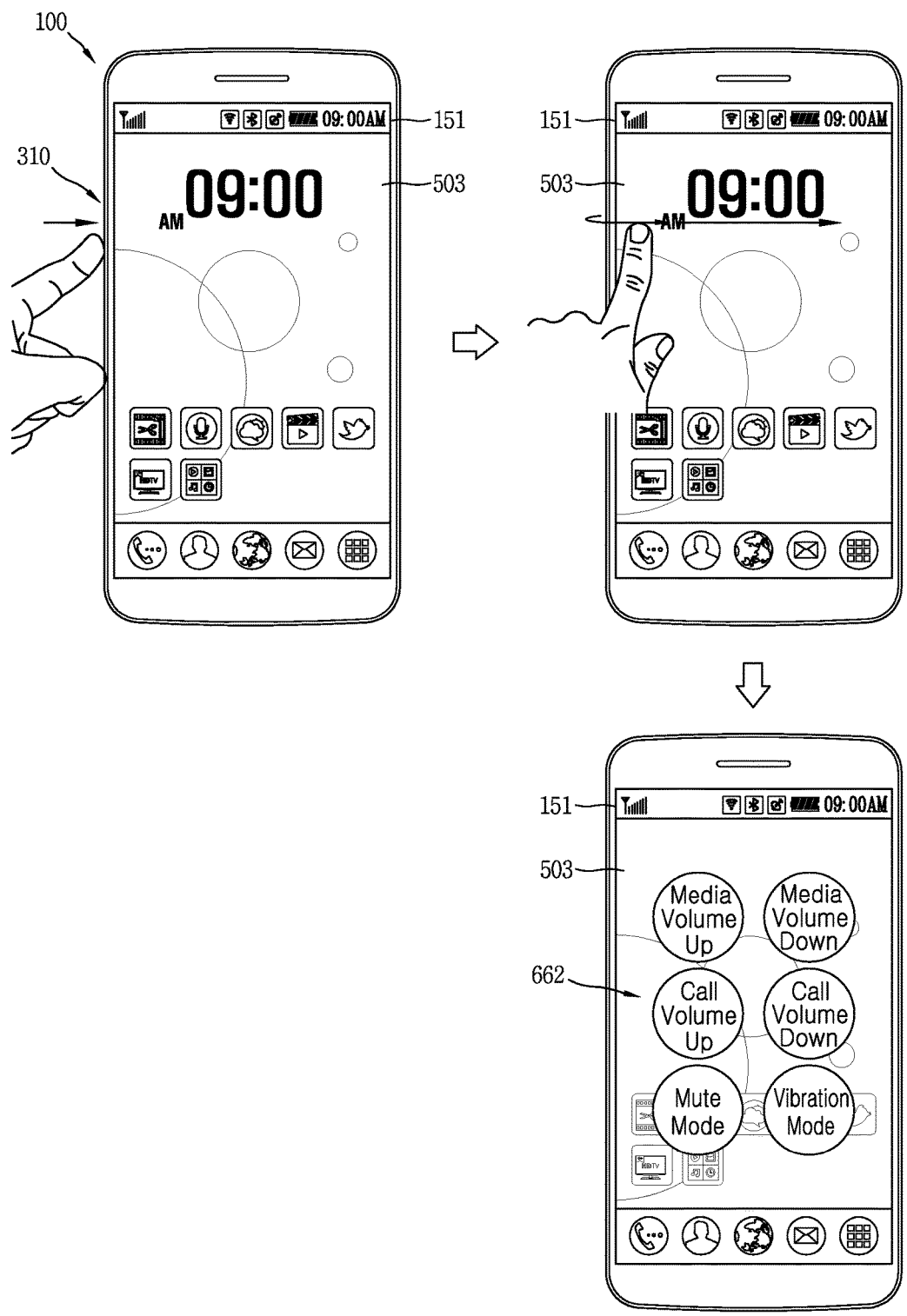

Referring to FIG. 10B, the mobile terminal includes a first metal key unit 310 formed on a side surface of the body of the mobile terminal 100. When a pressure is applied to the first metal key unit 310, the controller 180 controls a volume output from the audio output unit 152.

The controller 180 controls the display unit 151 to output a state change screen 662 for setting a volume state, based on a touch input firstly applied to the first metal key unit 310 and then consecutively applied to the display unit 151. The state change screen 662 may include at least one graphic image to change a driving mode of the audio output unit 152.

In this embodiment, screen information to change a setting of a function controlled according to a pressure applied to the first metal key unit 310, is output, based on a touch input firstly applied to the first metal key unit 310 and then consecutively applied to the display unit 151. Thus, a user may be provided with the screen information without entering an additional step.

Figure 10C:
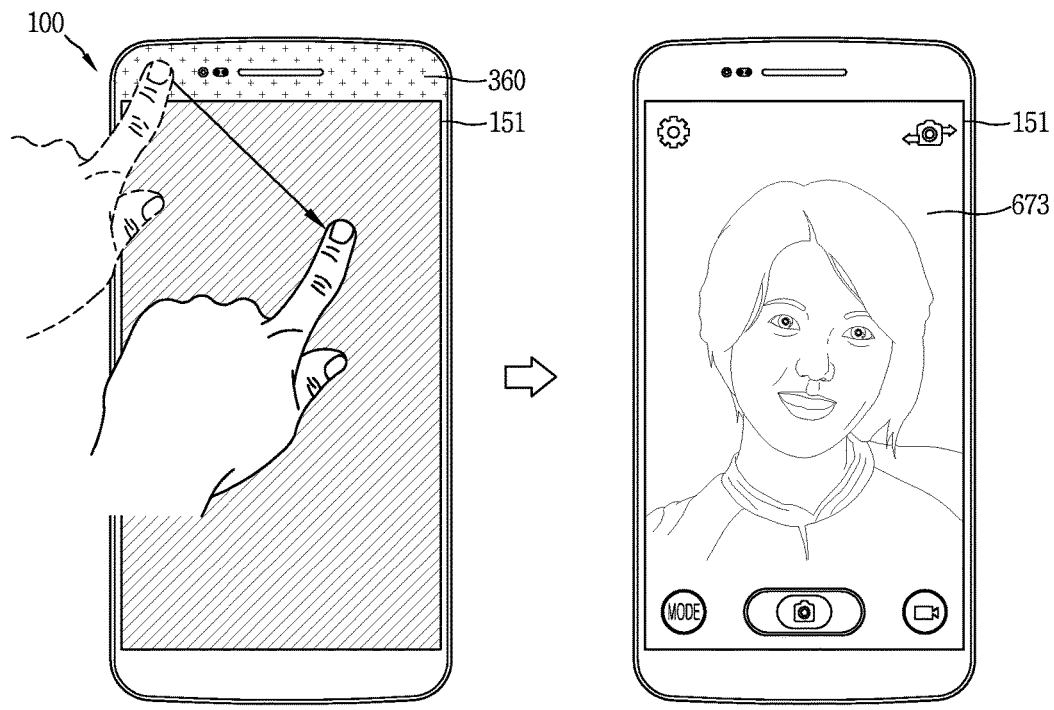

Referring to FIG. 10C, the mobile terminal 100 include a sixth metal key unit 360 formed at a bezel portion which encloses the display unit 151. At least one electronic component may be disposed on the bezel portion. For instance, the camera 121 may be disposed on the bezel portion, and the sixth metal key unit 360 may be formed to enclose the camera 121.

The controller 180 activates the camera 121 based on a touch input firstly applied to a region of the sixth metal key unit 360 adjacent to the camera 121, and then consecutively applied to the display unit 151. In an off state of the display unit 151, the controller 180 activates the display unit 151 based on the touch input, and displays a preview image 673 obtained by the camera 121.

With such a configuration, a user may execute a capturing function more rapidly by applying a pressure to the metal key unit adjacent to the camera, without executing an application by activating the display unit 151 in order to capture an image by using the camera.

Figure 10D:
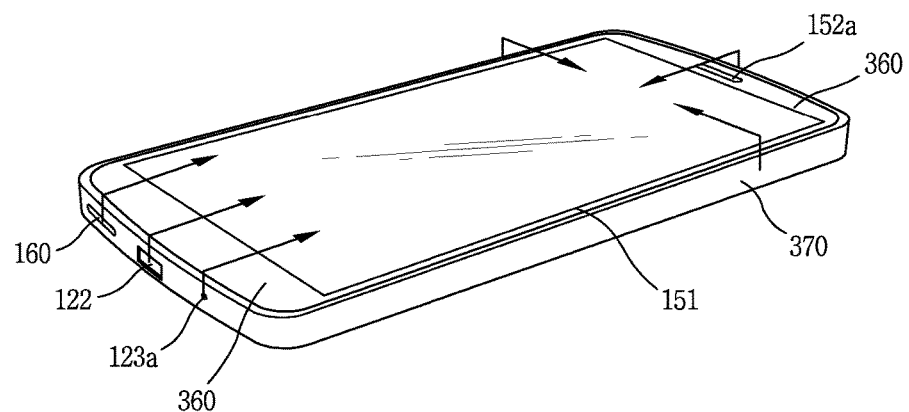

The mobile terminal 100 of FIG. 10D may include a metal key unit having a plurality of metal keys and formed on an external surface of the mobile terminal, the external surface forming the appearance of the mobile terminal. In a case where a touch input applied to the metal key adjacent to a corresponding electronic component is consecutively applied to the display unit 151, the controller 180 controls a function related to the electronic component to be executed immediately.

With such a configuration, a user may execute a specific function rapidly by applying a pressure to an external surface of the mobile terminal.

Figure 11A:
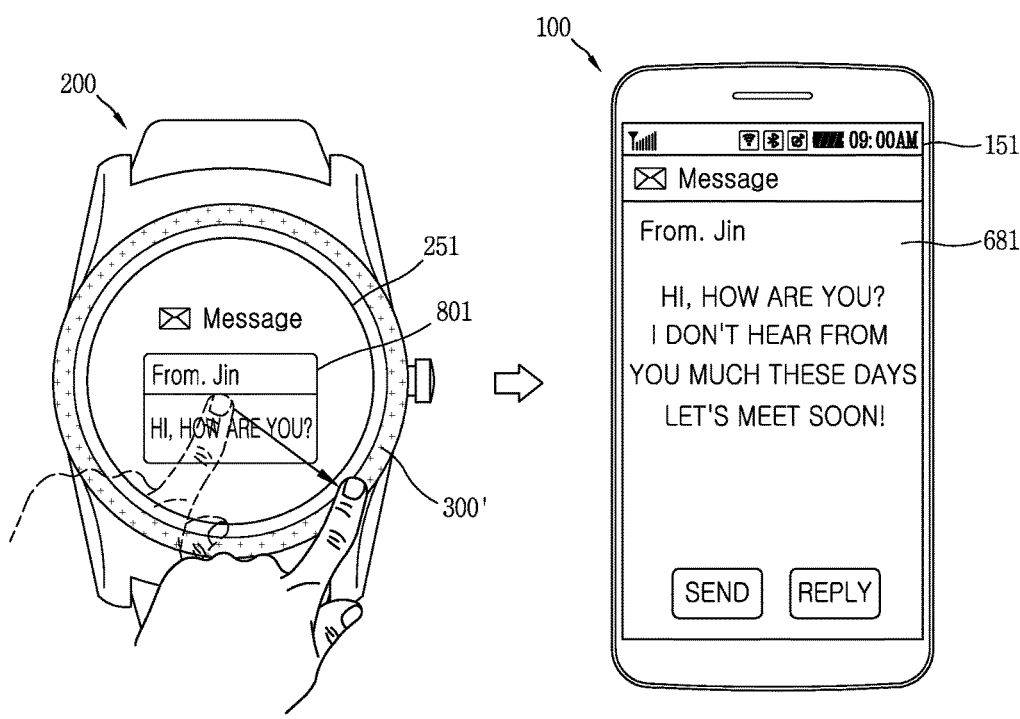
FIGS. 11A and 11B are conceptual views illustrating a method of interworking a watch-type mobile terminal with a mobile terminal, by using a metal key unit of the watch-type mobile terminal.
Figure 11B:
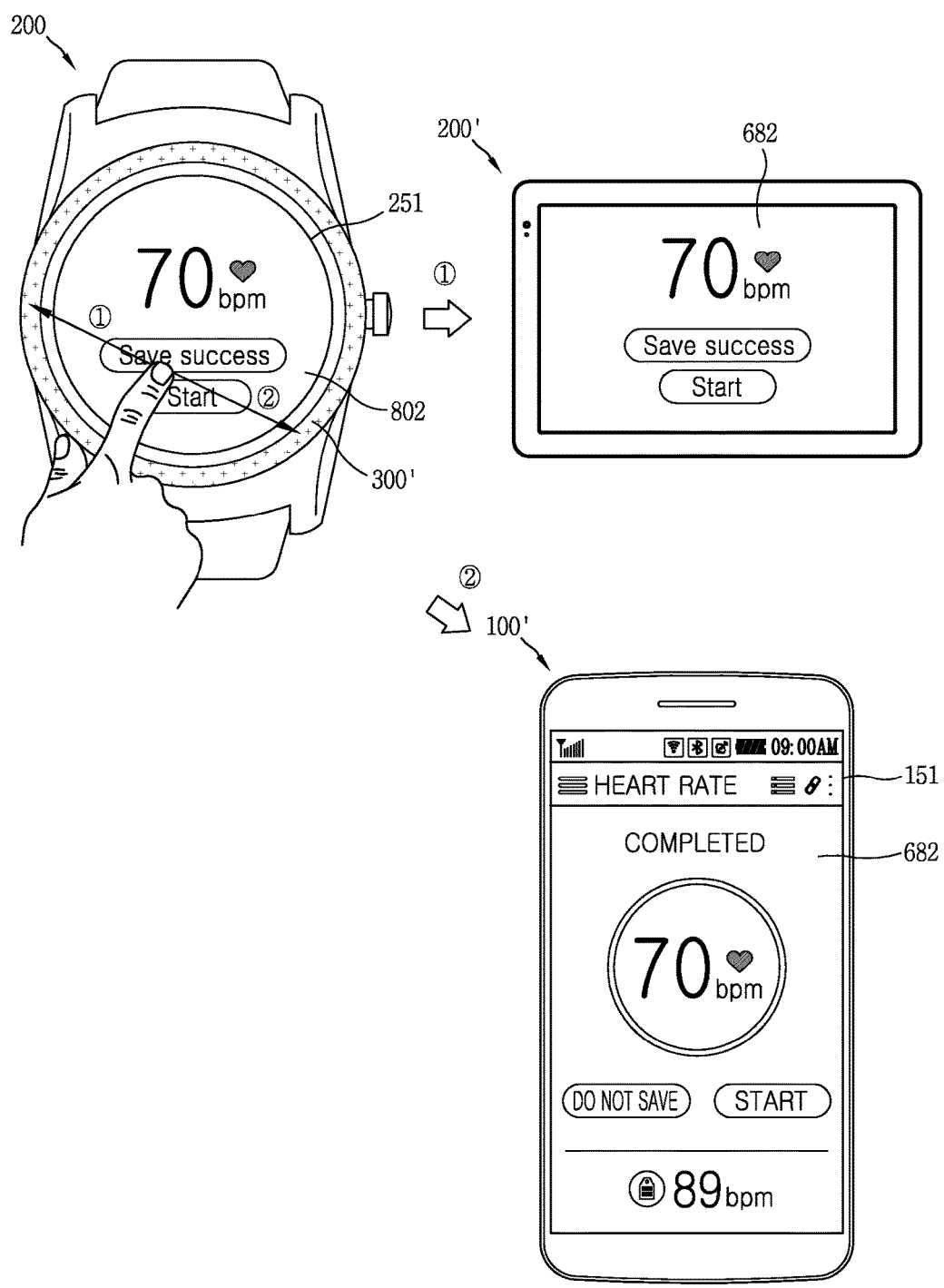

FIGS. 11A and 11B are conceptual views illustrating a method of interworking a watch-type mobile terminal with the mobile terminal serving as an external device, by using a metal key unit of the watch-type mobile terminal.

The watch-type mobile terminal 200 in this embodiment includes a display unit 251, and a metal bezel portion forming the appearance of the mobile terminal and formed to enclose the display unit 251. A metal key unit 300' is formed on the metal bezel portion. The watch-type mobile terminal executes wireless communication with at least one external device (the mobile terminal 100).

While first screen information 801 is being output to the display unit 251, the first screen information 801 is transmitted to the mobile terminal 100 based on a touch input consecutively applied to the display unit 251 and the metal key unit 300'. Accordingly, the display unit 151 of the mobile terminal 100 may output a first image 681 corresponding to the first screen information 801.

That is, a user may control the watch-type mobile terminal 200 by applying a touch input to the display unit 251, and may control interworking with the external device (the mobile terminal 100) wirelessly-connected thereto, by using the metal key unit 300'.

Referring to FIG. 11B, the metal key unit 300' formed on the metal bezel portion may be composed of a plurality of metal keys. A controller 280 may control a different external device which executes wireless communication with the watch-type mobile terminal 200, based on a region of a metal key which senses a pressure, among the plurality of metal keys formed on the metal bezel portion.

For instance, while first screen information 802 is being output to the display unit 251, the controller 180 transmits the first screen information 802 to a first external device 200', based on a touch input applied to the metal key unit 300' in a first direction. A display unit of the first external device 200' may display a second image 682 related to the first screen information 802.

While the first screen information 802 is being output to the display unit 251, the controller 280 transmits the first screen information 802 to a second external device 100', based on a touch input applied to the metal key unit 300' in a second direction. A display unit of the second external device 100' may display a second image 682 related to the first screen information 802.

Figure 12:
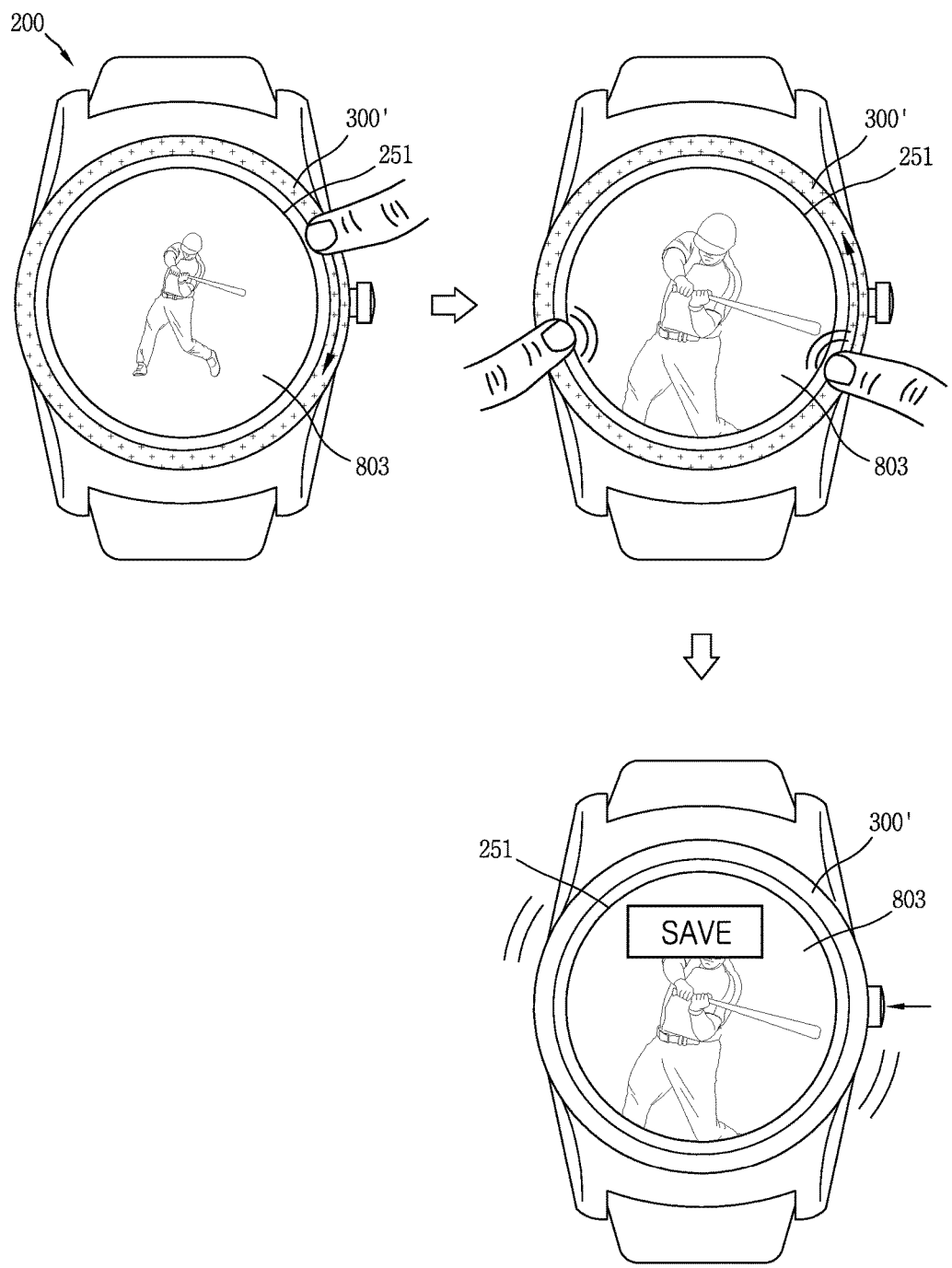
FIG. 12 is a conceptual view illustrating a method of executing a different function based on a type of a pressure applied to a metal key unit of a watch-type mobile terminal.

FIG. 12 is a conceptual view illustrating a method of executing a different function based on a type of a pressure applied to a metal key unit of a watch-type mobile terminal.

Referring to FIG. 12, the watch-type mobile terminal 200 includes a metal key unit 300' formed on a bezel portion which encloses a display unit 251. Once a touch input consecutively applied to the metal key unit 300' is sensed, the controller 280 enlarges or contracts an image 803 displayed on the display unit 251.

When a touch input applied to an inconsecutive region of the metal key unit 300' is sensed, the controller 280 may capture (and store) the image 803.

That is, a user may execute various functions by applying a different type of pressure to a different region.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a case, wherein a portion of the case is formed of a metallic material;
a metal key unit coupled to the case, wherein the metal key unit includes a flexible printed circuit board coupled to a lower part of the case and a pressure sensor formed at the flexible printed circuit board, wherein the pressure sensor is configured to sense pressure of a first touch input applied to the metal key unit by sensing a changed resistance value;
a touch screen; and
a controller operably coupled with the metal key unit and the touch screen and configured to:
recognize the sensed pressure of the first touch input received at the metal key unit, wherein the first touch input is a single touch input;
recognize a position of the recognized pressure of the first touch input;
execute a specific function based on the recognized pressure; and
cause the touch screen to display information corresponding to the executed specific function on a region of the touch screen such that:
the information is displayed on a first region of the touch screen adjacent to a first position of the metal key unit when the recognized pressure of the touch input is recognized at the first position; and
the information is displayed on a second region of the touch screen adjacent to a second position of the metal key unit when the recognized pressure of the touch input is recognized at the second position.

2. The mobile terminal of claim 1, wherein the touch screen is configured to receive a second touch input and display screen information,
wherein the case includes:
a rear case which forms a side of the mobile terminal;
a front case which encloses an edge region of the touch screen; and
a rear cover which forms a rear side of the mobile terminal, the rear side being an opposite side of the touch screen, and
wherein the metal key unit further includes a plurality of metal keys, and is formed on at least one of the rear case, the front case, or the rear cover.

3. The mobile terminal of claim 2, wherein the controller is further configured to cause the touch screen to display different screen information based on a change of the pressure of the first touch input received at the metal key unit.

4. The mobile terminal of claim 3, wherein:
the controller is further configured to execute a first function based on the second touch input received at the touch screen; and
when the first touch input is received at the metal key unit while the second touch input is applied to the touch screen, the controller is further configured to execute a second function that is different from the first function.

5. The mobile terminal of claim 4, wherein the controller is further configured to:
execute a function of one application; and
execute a different function of the application based on a third touch input received via the plurality of metal keys, the third touch input received while the function of the application is executed and while no touch input is applied to the touch screen.

6. The mobile terminal of claim 4, wherein the controller is further configured to cause the touch screen to:
display an image at a first region of the touch screen in response to a third touch input received via a first one of the plurality of metal keys, the first region being adjacent to the first one of the plurality of metal keys that receives the third touch input; and
display an image at a second region of the touch screen in response to a fourth touch input received via a second one of the plurality of metal keys, the second region being adjacent to the second one of the plurality of metal keys that receives the fourth touch input,
wherein the first region and the second region are different, and the first one of the plurality of metal keys and the second one of the plurality of metal keys are different.

7. The mobile terminal of claim 6, wherein the displayed image is an image of an application that is executed at a time when the first or second touch input is received at the first or second one of the plurality of metal keys.

8. The mobile terminal of claim 1, wherein the controller is further configured to execute a different function based on a level of the recognized pressure such that:
a first function is executed when the recognized pressure is a first level; and
a second function is executed when the recognized pressure is a second level.

9. The mobile terminal of claim 8, further comprising a speaker operably coupled with the controller and configured to output audio,
wherein:
when pressure of the first level is applied to the metal key unit, the controller is further configured to control a volume of the audio output from the speaker; and
when pressure of the second level, which is greater than the first level, is applied to the metal key unit, the controller is further configured to cause the touch screen to display an image including icons for executing applications.

10. The mobile terminal of claim 8, wherein the controller is further configured to cause the touch screen to display a different menu image including a different icon based on pressure of a different level applied to the metal key unit.

11. The mobile terminal of claim 1, further comprising a memory,
wherein the controller is further configured to cause the touch screen to display specific screen information or cause the memory to store the specific screen information displayed via the touch screen based on a touch input consecutively received at the metal key unit and the touch screen.

12. The mobile terminal of claim 11, wherein the specific screen information is different based on a region of the metal key unit where the consecutive touch input is applied such that first content of the specific screen information is displayed when the region of the metal key unit is a first region and second content of the specific screen information is displayed when the region of the metal key unit is a second region that is different from the first region.

13. The mobile terminal of claim 12, wherein:
the consecutive touch input is initiated at the region of the metal key unit and finished at a region of the touch screen; and
the controller is further configured to cause the memory to store some contents included in the specific screen information based on the consecutive touch input.

14. The mobile terminal of claim 11, wherein the controller is further configured to cause the memory to store execution information of an application corresponding to screen information displayed on the touch screen based on a first consecutive touch input that is applied to the touch screen first and then applied to the metal key unit.

15. The mobile terminal of claim 14, wherein:
the controller is further configured to cause the touch screen to re-display the screen information based on the stored execution information, the screen information re-displayed in response to a second consecutive touch input that is applied to the metal key unit first and then applied to the touch screen; and
the second consecutive touch input is received after the first consecutive touch input is received.

16. The mobile terminal of claim 1, wherein the controller is further configured to execute a specific function based on a touch region of the touch screen to which a second touch input is applied when the pressure of the first touch input is recognized.

17. The mobile terminal of claim 16, wherein the first touch input applied to a touch region of the metal key unit is continuously followed by the second touch input applied to the touch region of the touch screen such that a touch initially applied to the touch region of the metal key unit and finished at the touch region of the touch screen is maintained from the first touch input to the second touch input.

18. The mobile terminal of claim 1, wherein:
the case includes a plurality of electronic components; and
when a second touch input is initially applied to the metal key unit located at a region adjacent to one of the plurality of electronic components and then the second touch input is moved and subsequently applied to the touch screen, the controller is further configured to cause the touch screen to display screen information related to the one of the plurality of electronic components.

19. The mobile terminal of claim 1, wherein the first touch input received at the metal key unit is recognized by the controller when the pressure is greater than a reference pressure value, and
wherein when the first touch input is a consecutive touch input applied to both the touch screen and the metal key unit, the controller is further configured to:
decrease the reference pressure value if the consecutive touch input is initially applied to the touch screen; and
increase the reference pressure value if the consecutive touch input is initially applied to the metal key unit.

20. The mobile terminal of claim 1, wherein the metal key unit comprises:
a first metal key located on one side surface of the mobile terminal, wherein the first position is on the first metal key;
a second metal key located on another side surface of the mobile terminal, wherein the second position is on the second metal key.

* * * * *